US005769416A

United States Patent [19]

Takemoto et al.

[11] Patent Number: 5,769,416

[45] Date of Patent: Jun. 23, 1998

[54] METALLIC BODY DETECTING APPARATUS

[75] Inventors: Takatoshi Takemoto; Kazunari Kawashima, both of Tokyo; Shigeru Handa, Hachioji, all of Japan

[73] Assignee: Kabushiki Kaisha Ace Denken, Tokyo, Japan

[21] Appl. No.: 535,254

[22] PCT Filed: Apr. 25, 1994

[86] PCT No.: PCT/JP94/00679

§ 371 Date: Oct. 30, 1995

§ 102(e) Date: Oct. 30, 1995

[87] PCT Pub. No.: WO94/25128

PCT Pub. Date: Nov. 10, 1994

[30] Foreign Application Priority Data

| | | | |
|---|---|---|---|
| Apr. 28, 1993 | [JP] | Japan | 5-103095 |
| Sep. 2, 1993 | [JP] | Japan | 5-218830 |

[51] Int. Cl.[6] .................... A63F 7/02; G01V 3/08

[52] U.S. Cl. .................... 273/121 B

[58] Field of Search .................... 273/118, 119, 273/121

[56] References Cited

U.S. PATENT DOCUMENTS

| | | | |
|---|---|---|---|
| 5,388,828 | 2/1995 | Takamoto et al. | 273/121 B |
| 5,405,143 | 4/1995 | Takemoto et al. | 273/121 B |
| 5,509,654 | 4/1996 | Takemoto et al. | 273/121 B |

FOREIGN PATENT DOCUMENTS

| | | | |
|---|---|---|---|
| 513395 | 11/1992 | European Pat. Off. | 273/121 B |
| 513399 | 11/1992 | European Pat. Off. | 273/121 B |
| 2-279186 | 11/1990 | Japan . | |
| 4-2377 | 1/1992 | Japan . | |
| 4-122374 | 4/1992 | Japan | 273/121 B |
| 4-122375 | 4/1992 | Japan . | |
| 4-152957 | 5/1992 | Japan | 273/12 B |
| 4-152958 | 5/1992 | Japan | 273/121 B |
| 92/09344 | 6/1992 | Japan | 273/121 B |
| 92/09345 | 6/1992 | Japan | 273/121 B |
| 4-189379 | 7/1992 | Japan | 273/121 B |
| 4-189380 | 7/1992 | Japan | 273/121 B |
| 2230463 | 10/1990 | United Kingdom | 273/121 B |
| 92/04954 | 4/1992 | WIPO | 273/121 B |
| 93/09858 | 5/1993 | WIPO | 273/121 B |

*Primary Examiner*—Raleigh W. Chiu
*Attorney, Agent, or Firm*—Seed and Berry L.L.P.

[57] ABSTRACT

A pachinko ball sensing apparatus which can detect pachinko balls on a base board, and can accurately detect and count propelled pachinko balls is provided. The pachinko ball sensing apparatus comprises a propelled ball point storage medium for storing a plurality of detection positions along a propelled ball guide rail on the base board as propelled ball points, a propelled ball counter (300) for storing the number of propelled pachinko balls, and a processor (30) which reads sense data for the propelled ball points stored on the propelled ball point storage medium after a lapse of a predetermined wait time and when a value of the sense data changes, counts up a value of the propelled ball counter.

18 Claims, 18 Drawing Sheets

METALLIC BODY DETECTING APPARATUS

TECHNICAL FIELD

This invention relates to a metallic body detecting apparatus for detecting metal bodies such as pachinko balls in a pachinko ball (Japanese pinball) machine.

TECHNICAL BACKGROUND

It may become necessary to detect the position of a metallic body within in a determined area, particularly in a plane area, for example, to detect a moving path of a metallic body moving in a plane area or when metal bodies are distributed in one area, to detect their distribution pattern. A specific example of the former is to detect a moving path of game play media in a gaming machine.

With some gaming machines, a player moves a metallic body, such as a metal ball, within a specific space set in the gaming machine and may or may not win the game depending on the destination of the metal ball. Pachinko ball machines are typical of such gaming machines; with a pachinko ball machine, a player plays a game by dropping a metal ball called a "pachinko ball" into a space sandwiched between parallel planes in which a large number of obstacles are located.

A general pachinko ball machine has a base board for providing a space within which pachinko balls move, a glass plate spaced from the base board at a given interval to cover the base board, and a propelling mechanism for propelling pachinko balls into the space provided by the base board and the glass plate. The pachinko ball machine is set up so that the base board becomes substantially vertical. The base board is formed with a plurality of winning holes which the player causes a pachinko ball to enter for a winning game play, and through which the pachinko ball is discharged from the base board, and an out hole into which pachinko balls that have not entered the winning holes are finally collected for discharging the pachinko balls from the base board.

A large number of pins (nails) are set up substantially perpendicular to the base board in such a state that they project from the base board as far as the diameter of a pachinko ball, and they form obstacles with which pachinko balls dropping along the base board frequently collide, causing their direction of motion to fluctuate. The pins are located on the base board in a distribution pattern determined so as to guide pachinko balls colliding with the pins toward or away from the winning holes while causing the direction of motion of the pachinko balls to fluctuate.

By the way, winning game play conditions at each pachinko ball machine need to be managed at pachinko ball parlors having a large number of such pachinko ball machines. That is, personnel of the pachinko ball parlor need to identify machines having an unbalanced or abnormal path of pachinko balls so as to replace or repair them. For example, if machines at which it is easy for players to win game plays are left as they are, the pachinko ball parlor suffers a great administration loss; such machines need to be located. In contrast, if the pachinko ball parlor contains machines at which it is abnormally difficult for players to win game plays, the pachinko ball parlor will lose their customers; such machines also need to be located. Also, while players play games, personnel of the pachinko ball parlor need to identify any players performing such illegal operation as guiding pachinko balls with a magnet, etc.

A conventional metallic body detecting apparatus for such purposes is described in Japanese Patent Laid-Open No.Hei 2-279186.

In this publication, a pachinko ball detecting apparatus is disclosed. The detecting apparatus has a metal sensor called a sensing matrix comprising a row of transmission coil group in which transmission coils with continuous transmission units like open rings are arranged in one direction and a reception coil group in which reception coils with continuous reception units like open rings inductively coupling with the transmission units are arranged in a direction crossing the row of transmission coil group. The metal sensor is connected to a controller for sensing whether or not a metallic body exists at each overlapping point of the transmission and reception units.

The metal sensor can be attached to a glass plate covering a base board of a pachinko ball machine for detecting the position of a pachinko ball on the base board of the pachinko ball machine.

By the way, a large number of transmission and reception coil rows need to be installed to enhance the detection accuracy. However, they comprise coils like open rings, and thus have a complicated structure, and the wiring density cannot be increased.

In contrast, the present applicant proposed a sensor comprising transmission lines and reception lines in place of the coil rows in the specification of the application in Japan (Japanese Patent Application No.Hei2-244898, Japanese Patent Laid-Open No.Hei 4-122375), wherein the sensing matrix comprises a plurality of parallel turned transmission lines installed on one face of a wiring board and a plurality of parallel turned reception lines installed on the opposed face of the wiring board crossing the transmission lines so that the reception lines are electro-magnetically coupled with the transmission lines.

The transmission lines and reception lines of the sensing matrix are connected to a transmission circuit and reception circuit of the controller, a signal current is made to flow into the transmission lines in sequence, and current induced by the signal current is sensed for each reception line in sequence, whereby the presence or absence of a metallic body is detected from the induced current detected at the reception circuit and the position of the metallic body can be detected from a combination of the transmission line on which the signal current flows and the reception lines on which the reduced current is received.

That is, the sensing matrix consists of the intersections of the transmission and reception lines as sensing units, which are positioned like a matrix.

For such a sensor to count the number of propelled balls, namely, the number of balls propelled into a gaming area by a propelling mechanism, any sensing unit in the area through which propelled balls pass is selected, whether or not a pachinko ball passes through the sensing unit is checked, and a signal when it passes through the sensing unit is detected. A counter counts the detection signal for counting the number of balls.

Such a detecting apparatus is excellent in easily and rapidly providing data representing a pachinko ball path on the base board of a pachinko ball machine. However, propelled balls move at extremely high speed and are hard to catch. Thus, a pachinko ball may be unable to be caught at a predetermined sensing unit. In such a case, it is not counted, causing an error to occur in counting the number of propelled balls.

When the conventional metallic body detecting apparatus makes a signal flow into transmission coils or lines, the signal may not only be received by reception coils or lines, but also have an electromagnetic effect on the outside.

Particularly, to use the metallic body detecting apparatus for a pachinko ball machine in a pachinko ball parlor having pachinko ball machines installed contiguously and facing each other, mutual interference may be caused by the effect from transmission lines of another metallic body detecting apparatus for a contiguous pachinko ball machine.

That is, usually two rows of contiguous pachinko ball machines 10 facing in opposite directions are placed in a pachinko ball parlor for the convenience of users 1000, as shown in FIG. 19. Further, the pachinko ball parlor has several pachinko ball machine 10 groups each placed in such an arrangement as an island. FIG. 19 shows the general distance between gaming machines 10 facing in opposite directions and the general interval between contiguous gaming machines 10 in the same row.

It is desired in the pachinko ball parlor, to shorten the interval or distance between gaming machines 10 as much as possible so as to be able to install as many gaming machines as possible in the pachinko ball parlor, thus increasing profits and widening user's space as much as possible so that the user does not have a sense of being oppressed. However, the smaller the interval or distance between gaming machines 10, the greater the effect from a gaming machine 10 facing in an opposite direction or a contiguous gaming machine 10, thus lowering positioning accuracy.

DISCLOSURE OF INVENTION

It is a first object of the invention to provide a metallic body detecting apparatus which can be adapted to reliably detect passage of metal balls propelled at high speed as in a pachinko ball machine, and to count the metal balls.

To accomplish the first object, according to one form of the invention, there is provided a metallic body detecting apparatus comprising a sensor placed facing a base board on which a gaming area of a pachinko ball machine is set and a signal processing system which drives the sensor for sensing pachinko balls, characterized in that the sensor has a plurality of sensing units each for sensing the presence of a pachinko ball, the sensing units being placed in a plurality of detection points in an area through which pachinko balls propelled into the gaming area can pass, on the base board of the pachinko ball machine, and that the signal processing system has storage means for storing information selecting one or more sensing units from among the sensing units positioned in the detection points, receives a signal from each sensing unit positioned in the detection points selected according to the information stored in the storage means, and determines whether or not a signal level of each signal changes as compared with a reference value, when the signal level from a sensing unit belonging to any detection point changes, the signal processing system determining that a pachinko ball propelled into the gaming area has been detected.

The area in which the sensing units are placed can be defined in an entrance area to the gaming area, along a guide rail disposed on the base board of the gaming machine.

When the signal level change is larger than a signal ripple with respect to the reference value, the signal processing system can determine the signal level changing compared with the reference value.

The signal processing system can further include a counter for counting the number of times a pachinko ball has been detected.

The sensor can be a matrix sensor comprising sensing units placed like a matrix, in which case the signal processing system can further include storage means for storing information specifying sensing units positioned at the detection points and can detect a pachinko ball propelled into the gaming area as to a signal from the sensing units belonging to the stored detection points.

The sensor can have a plurality of transmission lines excited by a signal current, a plurality of reception lines being placed crossing the transmission lines for receiving induced current by exciting the transmission lines, and a board for supporting them as a matrix sensor comprising intersections of the transmission and reception lines placed like a matrix as the sensing units.

When a pachinko ball passes through an area on the base board where detection points are set, for example, detection positions along the guide rail, a sensor signal for the detection points changes and the metallic body detecting apparatus of the invention senses it. When the signal processing system compares the sensor signal with a reference value and detects a significant change, it determines that a pachinko ball has passed through the area. Since a plurality of detection points are set, even if a pachinko ball moves at high speed, the possibility that it will be able to be detected at any of the points is high; pachinko balls propelled into the gaming area can be reliably sensed and detected.

It is a second object of the invention to provide a metallic body detecting apparatus which reduces the electromagnetic effect leaking to the outside of the apparatus from a transmission section used with the metallic body detecting apparatus.

The second object of the invention can be accomplished by providing a metallic body detecting apparatus comprising a matrix sensor having a detection area spreading across a plane and a signal processing system for driving the matrix sensor for detecting the presence of a metallic body and the position thereof, the matrix sensor having a transmission line group consisting of parallel lines, a reception line group consisting of parallel lines, and a board for supporting them, the transmission line group and the reception line group crossing each other, with intersections of the transmission and reception lines being arranged like a matrix on the board, wherein the improvement comprises the signal processing system comprising a transmission circuit for scanning the transmission lines in sequence and sending a signal current to them, a reception circuit for scanning the reception lines in sequence and reading their reception signals in sequence, and a signal processor for outputting control signals to the transmission and reception circuits for causing the circuits to scan the transmission lines and the reception lines respectively, determining whether or not a metallic body exists from the signal received at the reception circuit, and detecting a position at which the metallic body is sensed, based on information indicating a transmission line scanning position of the transmission circuit and information indicating a reception line scanning position of the reception circuit, the transmission circuit for limiting signal currents sent to predetermined specific transmission lines in the transmission line group so that they are lower than signal currents to other transmission lines.

In the invention, the metallic body detecting apparatus comprises the matrix sensor having a transmission line group and a reception line group, and the signal processing system for driving the matrix sensor for detecting the presence of a metallic body and the position thereof.

The transmission circuit and reception circuit of the signal processing system scan the transmission and reception line groups respectively. The transmission circuit sends signal current to the transmission line group and the reception circuit receives a reception signal from the reception line group.

Further, the signal processor of the signal processing system outputs control signals to the transmission and reception circuits for causing the circuits to scan the transmission lines and the reception lines respectively, determines whether or not a metallic body exists from the signal received at the reception circuit, and detects a position at which the metallic body is sensed, based on information indicating a transmission line scanning position of the transmission circuit and information indicating a reception line scanning position of the reception circuit.

Further, the transmission circuit limits signal currents sent to predetermined transmission lines in the transmission line group so that they are lower than signal currents to other transmission lines. The transmission lines leaking the largest electromagnetic effect are selected as the transmission lines to which transmission currents are limited.

BEST MODE FOR CARRYING OUT THE INVENTION

Referring now to the accompanying drawings, there are shown preferred embodiments of the invention.

Prior to the description of the embodiments, pachinko ball machines to which the embodiments of the invention can be applied will be discussed with reference to FIG. 3.

Figure 3:
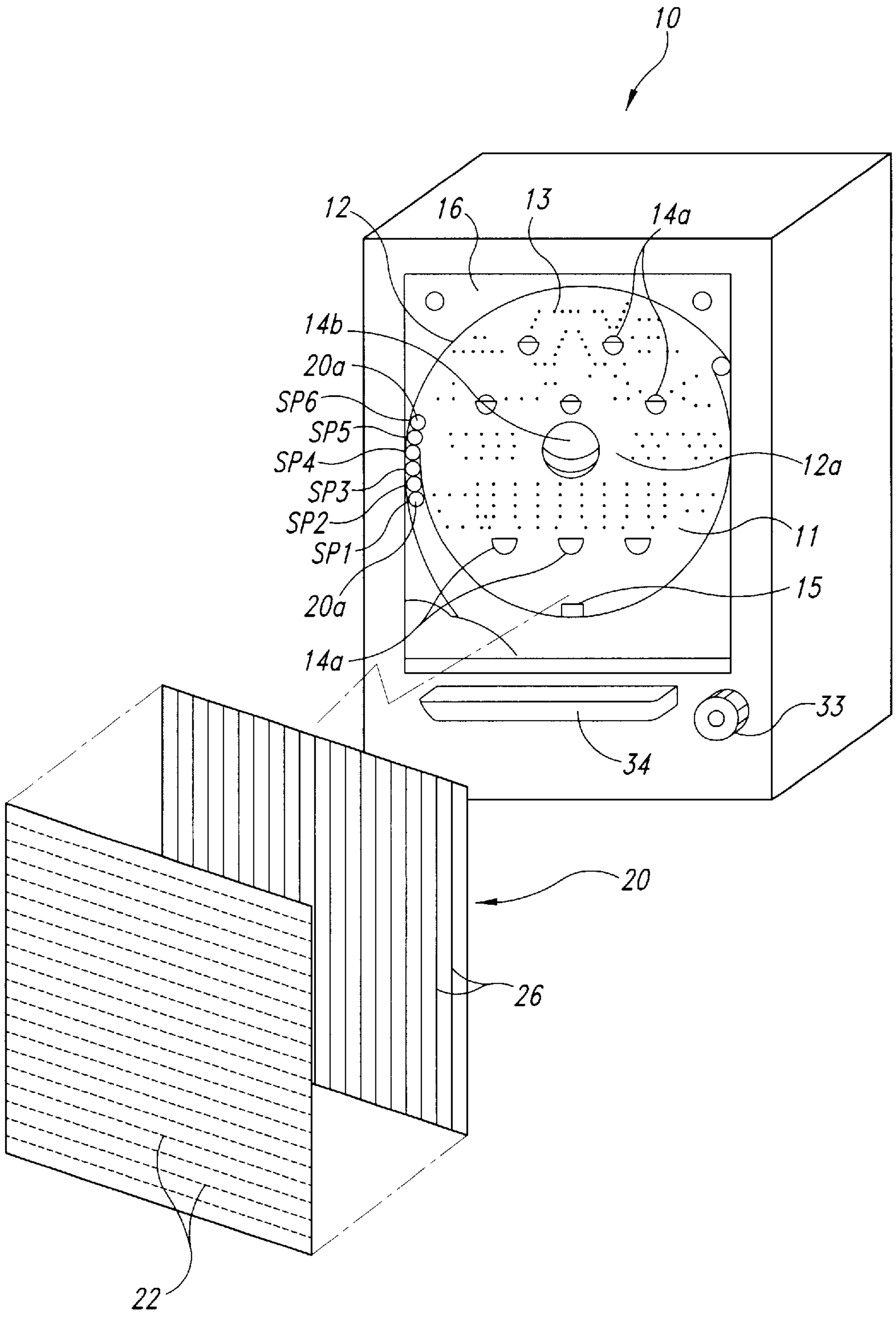
FIG. 3 is a conceptually exploded perspective view of a pachinko ball machine and a detection section (matrix sensor) of a metallic body detecting apparatus.

The pachinko ball machine shown in FIG. 3 has a base board 11 for providing a space in which pachinko balls move, a surface glass panel 16 spaced from the base board at a given interval to cover the base board, and a propelling mechanism for propelling pachinko balls into the space provided by the base board 11 and the surface glass panel 16. The pachinko ball machine is set up so that the base board 11 is substantially vertical.

The base board 11 is provided with a guide rail 12. The inner area of the base board 11 surrounded by the guide rail 12 provides a gaming area 12*a*. The guide rail 12 guides a pachinko ball propelled by the propelling mechanism along the rail to the upper position (upstream part) in the vertical direction of the gaming area 12*a*.

The gaming area 12*a* is formed with a plurality of winning holes 14*a* into which the player causes a pachinko ball to enter for a winning game play, and as a result of which the pachinko ball is discharged from the base board 11, a winning game play effect device 14*b* being located at the center of the base board from an upstream direction to a downstream direction, for providing a special winning game play condition, and an out hole 15 into which pachinko balls that do not enter the winning holes 14*a* are finally collected so as to discharge the pachinko balls from the base board 11. The winning game play effect device 14*b* is a device whose state changes each time a pachinko ball enters a specific winning hole 14*a*, and which pays out a large number of pachinko balls to the player for a winning game play when a certain condition is satisfied. For example, rotating drums, as with a slot machine, are provided, and each time the player wins a game play, they are rotated. When a predetermined symbol pattern is completed, a large number of pachinko balls are paid out to the player for a special winning game play.

Figure 4:
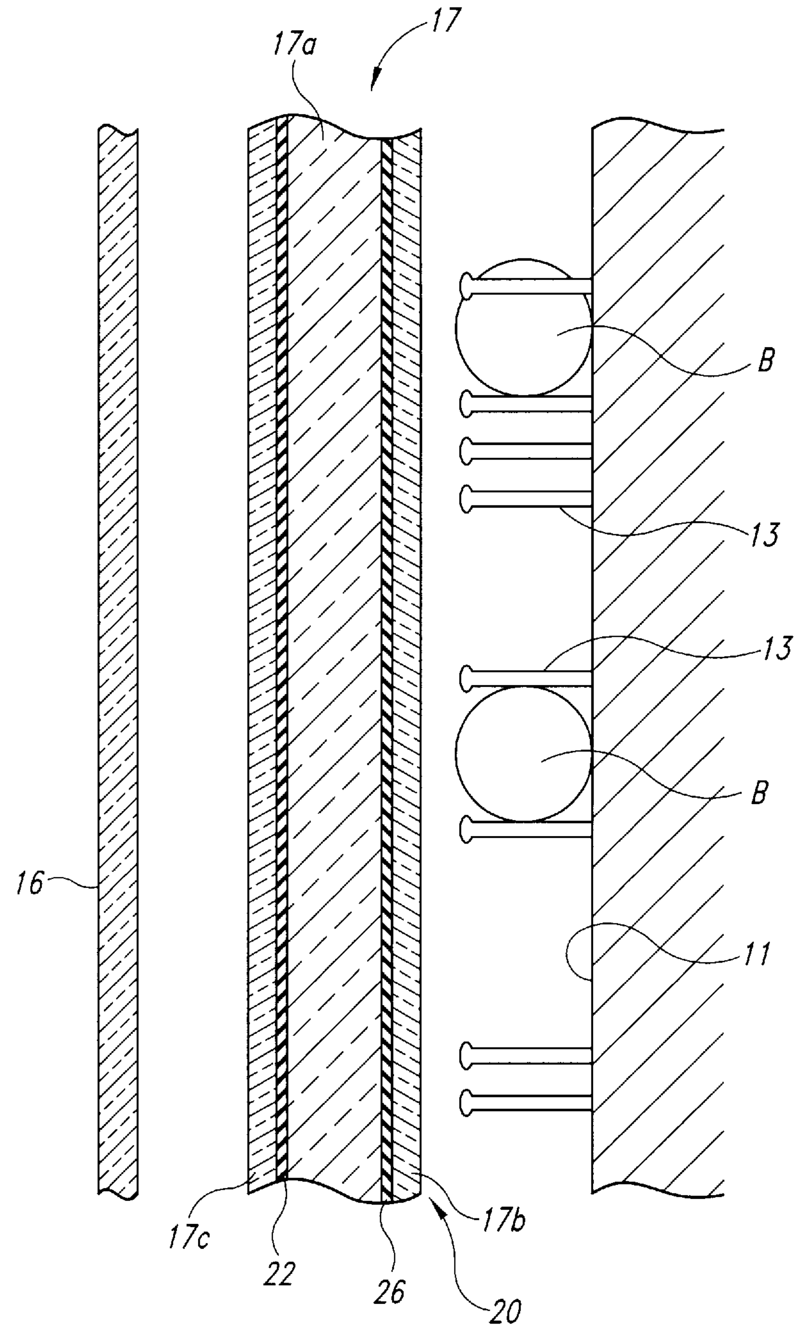
FIG. 4 is a sectional side view of a base board of the pachinko ball machine.

The gaming area 12*a* of the base board 11 is provided with a large number of pins (nails) 13 with which pachinko balls B dropping along the base board 11 frequently collide causing their direction of motion to fluctuate. The pins 13 are hammered into the base board 11 substantially perpendicular to the base board 11 in a state in which they project from the base board 11 as far as the diameter of the metallic body B, as shown in FIG. 4. The pins 13 are distributed on the base board 11 for the purposes as described above.

A propelling handle 33 for players to propel pachinko balls and a pachinko ball return 34 for receiving pachinko balls paid out for winning game plays are located on the front face of the pachinko ball machine 10. The handle 33 is a part of the propelling mechanism.

As shown in FIG. 4, front glass covering the base board 11 has a double layer structure consisting of the surface glass substance 16 and an inner glass panel 17 along the base board 11 of the pachinko ball machine 10. The inner glass panel 17 consists of a glass panel 17*a* and surface glass 17*b* and 17*c* bonded to both faces of the glass substrate 17*a*.

Next, a first embodiment of a metallic body detecting apparatus (pachinko ball detecting apparatus) of the invention will be discussed with reference to the accompanying drawings.

Figure 6:
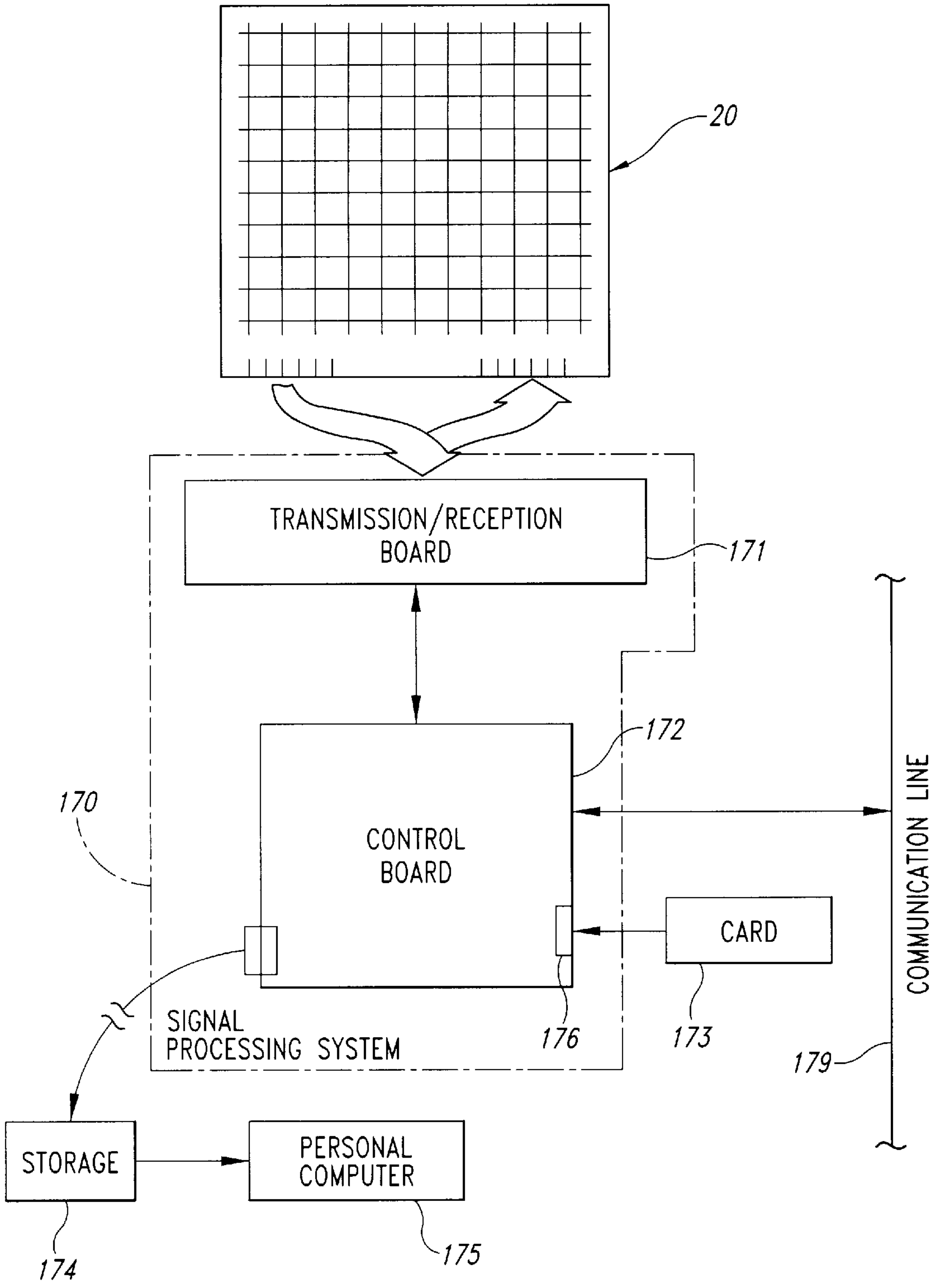
FIG. 6 is a schematic block diagram of the metallic body detecting apparatus.

The pachinko ball detecting apparatus of the first embodiment comprises a matrix sensor 20 having a detection area spreading across a plane and functioning as a metal sensor, and a signal processing system 170 which drives the matrix sensor 20 for sensing the presence of a pachinko ball and detecting the position thereof, as shown in FIG. 6.

Figure 5:
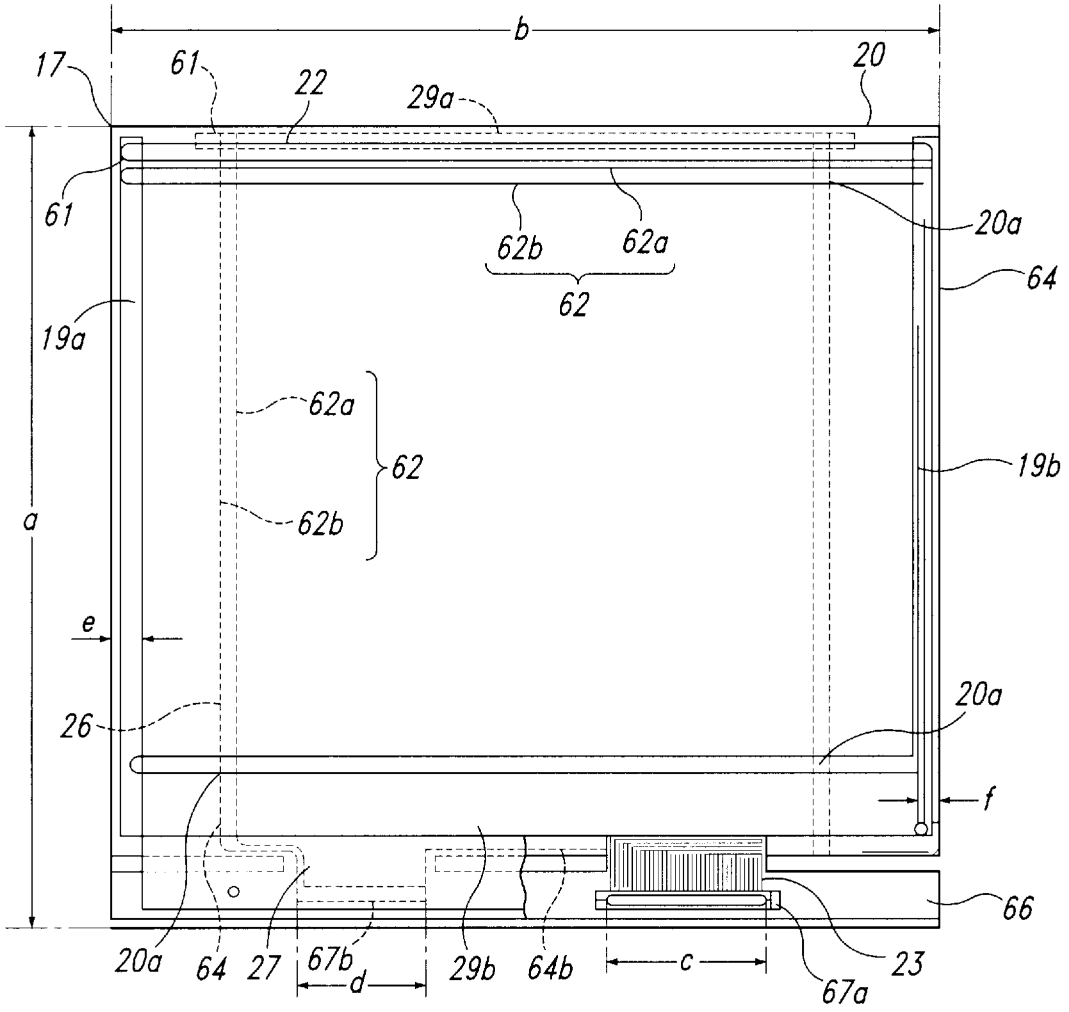
FIG. 5 is a front view showing the detection section (matrix sensor) of the metallic body detecting apparatus.

The matrix sensor 20 has a plurality of transmission lines 22, a plurality of reception lines 26, and a board for supporting the lines, as shown in FIG. 5. Each of the transmission lines 22 consists of a pair of conductors 62 forming a sending path 62*a* and a returning path 62*b*, which are parallel to each other. Likewise, each of the reception lines 26 consists of a pair of conductors 62 forming a sending path 62*a* and a returning path 62*b*, which are also parallel to each other. In the embodiment, the conductor 62 is made of copper wire coated with polyurethane for insulation, for example. A pair of the conductors 62 comprises a sending path and a returning path connected at one end and serving as input and output terminals for a signal on the other end.

The transmission lines 22 and the reception lines 26 are placed so as to cross each other. Specifically, for example, the transmission lines 22 are arranged at given intervals in a row direction and the reception lines 26 are arranged at given intervals in a column direction. The transmission lines 22 and the reception lines 26 are placed in such a manner, providing the intersections of the transmission lines 22 and the reception lines 26 like a matrix as sensing regions. Either the transmission lines 22 or the reception lines 26 may be placed in the row or column direction, as desired.

The signal processing system 170 has a transmission/reception board 171 functioning as transmission/reception means for driving the matrix sensor 20 and a control board 172 functioning as signal processing means for controlling the transmission/reception board 171 for receiving a detection signal and determining whether or not a pachinko ball exists based on the detection signal, and detecting the pachinko ball sensing position when a pachinko ball exists.

The transmission/reception board 171 has a transmission circuit 40 (see FIG. 7) for scanning the specified lines of the transmission lines 22 in sequence and sending a transmission signal thereto and a reception circuit 50 (see FIG. 9) for scanning the specified lines of the reception lines 26 in sequence and capturing reception signals of the reception lines in sequence, as described below.

The control board 172 specifies the transmission and reception lines to be scanned for the transmission/reception board 171, determines whether or not a pachinko ball exists from a signal received at the reception circuit 50, and detects the pachinko ball sensing position based on information indicating the transmission line scanning position at the transmission circuit 40 and information indicating the reception line scanning position at the reception circuit 50.

The control board 172 can store information indicating the position of a pachinko ball in time sequence for finding the moving path of the pachinko ball. From the moving path, the characteristics of the pachinko ball machine can be known and an abnormal path can also be detected for judging whether or not illegal operation has been performed.

Next, the matrix sensor will be described in more detail.

As shown in FIG. 4, the matrix sensor 20 is formed across a plane within the inner glass panel 17, which is on the side of the base board 11, of the two glass panels covering the base board 11, and therefore is disposed between the front glass panel 16 and the base board 11.

As shown in FIG. 5, in the matrix sensor 20, the transmission lines 22 are placed on one face (on the side of the surface glass) of the glass substrate 17*a* of the inner glass panel 17 in parallel in one direction. Each transmission line 22 is located on the glass substrate 17*a* so as to make a U-turn in the parallel direction at the end of the glass substrate 17*a*.

Likewise, the reception lines 26 are placed on the opposed face (on the side of the base board 11) of the glass substrate 17*a* of the inner glass panel 17 in parallel in one direction. Each reception line 26 is located on the glass substrate 17*a* so as to make a U-turn in the parallel direction at the end of the glass substrate 17*a*. A transmission terminal section 23 and a reception terminal section 27, functioning as connection sections of the transmission lines 22 and the reception lines 26, are both placed on the lower end of the inner glass panel 17 when the matrix sensor is mounted on a pachinko ball machine.

The reception lines 26 are located at right angles to plane parallel positions with the transmission lines 22 so as to be electro-magnetically coupled with the transmission lines 22, namely, in such a positional relation that a magnetic flux from the transmission line 22 may perpendicularly cross the reception lines. The transmission lines 22 and the reception lines 26 with the inner glass panel 17 as a substrate make up the plane matrix sensor 20.

As shown in FIG. 5, square portions surrounded by the transmission lines 22 and the reception lines 26 crossing each other (detection positions) provide sensing units 20*a*, 20*a*, . . . for sensing a pachinko ball. In the embodiment, the sensing units 20*a*, 20*a*, . . . are set to sizes capable of sensing the pachinko ball.

The inner glass panel 17 is a glass substrate in the shape of a quadrangle having dimensions of 367 mm ±10 mm in length a, 367 mm ±10 mm in width b, and 3.0–3.5 mm in thickness. Each of the surface panels 17*b* and 17*c* is shorter than the glass substrate 17*a* in length and the lower end of the glass substrate 17*a* is exposed.

To form the inner glass panel 17, the transmission lines 22 are bonded to one face of the glass substrate 17*a* with a transparent adhesive layer and the surface glass 17*c* is bonded thereon with a transparent adhesive layer; the reception lines 26 are bonded to the other face of the glass substrate 17*a* with a transparent adhesive layer and the surface glass 17*b* is bonded thereon with a transparent adhesive layer.

A turn substrate 19*a* and a transmission route substrate 19*b* shaped like an L letter are disposed in the left end part and right end part, respectively, on one face of the glass substrate 17*a*. A turn substrate 29*a* and a route substrate 29*b* are disposed in the upper end part and lower end part, respectively, on the other face of the glass substrate 17*a*.

Each of the transmission lines 22 consists of a turn part 61 formed on the turn substrate 19*a* and wires 62*a* and 62*b* soldered to the turn part 61. The input and output terminals of the transmission lines 22 are connected via route wires to the transmission terminal section 23.

On the other hand, each of the reception lines 26 consists of a turn part 61 formed on the turn substrate 29*a* and wires 62*a* and 62*b* soldered to the turn part 61. The lower end parts of the reception lines 26 are connected to the reception terminal section 27 by a route part 64 formed on the route substrate 29*b* bonded to the lower end of the other face of the glass substrate 17*a*.

To make the wires 62*a* and 62*b* invisible to the customers, their surfaces are of a matt black finish intended to prevent light reflection.

A preferred pattern of the matrix sensor 20 of a normal pachinko ball machine 10 consists of 32 rows of transmission lines 22 and 32 columns of reception lines 26, namely, 1024 sensing units 20*a* in total. The embodiment takes the pattern of the 32 rows of transmission lines 22 and 32 columns of reception lines 26 as an example. In FIG. 5, only inner parts of the pattern are shown.

Preferably, each of the wires making up the transmission lines 22 and the reception lines 26 is 25–30 μm thick. In the embodiment, as shown in FIG. 5, the entire widths of the transmission terminal section 23 and the reception terminal section 27, c and d, are each 126 mm and the widths of the longitudinally extending portions of the transmission turn substrate 19*a* and the transmission route substrate 19*b*, e and f, are each formed to 10 mm or less. The width of one line of the transmission terminal section 23 and the reception terminal section 27 is 1.5 mm.

The matrix sensor 20 is formed with a connector mounting plate 66 in the lower end part of the glass substrate 17*a*. The connector mounting plate 66 has two sides between which the lower end of the glass substrate 17*a* is sandwiched, and is integral with the inner glass panel 17. The connector mounting plate 66, which is made of plastic or stainless material, extends downward along the width of the inner glass panel 17 and is on an extension plane of the inner glass panel 17 of the matrix sensor 20.

A transmission connector 67*a* and a reception connector 67*b* are fixed to the positions of the connector mounting plate 66 corresponding to the transmission terminal section 23 and the reception terminal section 27. The terminals of the transmission terminal section 23 and the reception terminal section 27 are connected via the transmission and reception connectors to the transmission circuit 40 and the reception circuit 50.

The connector mounting plate 66 has the thickest portions in which the transmission connector 67*a* and the reception connector 67*b* are mounted. On the other hand, the transmission connector 67*a* and the reception connector 67*b* are short and the thickest portion of the connector mounting plate 66 is as thick as or thinner than the inner glass panel 17 of the matrix sensor 20.

The transmission/reception board 171 (see FIG. 6) connected to the transmission connector 67*a* and the reception connector 67*b* is placed on the connector mounting plate 66. The transmission/reception board 171 has the transmission circuit 40 (see FIG. 7) for transmitting signals to the transmission lines 22 of the matrix sensor 20, the reception circuit 50 (see FIG. 9) for receiving signals from the reception lines 26, and junction connectors (not shown) connected to the transmission connector 67*a* and the reception connector 67*b*.

The junction connectors are connected to the transmission connector 67*a* and the reception connector 67*b* for connecting the transmission terminal section 23 to the transmission circuit 40 and the reception terminal section 27 to the reception circuit 50.

Next, the signal processing system which processes signals of the matrix sensor 20 will be described.

As shown in FIG. 6, the matrix sensor 20 is placed under the control of the control board 172 spaced from the matrix sensor 20 via the transmission/reception board 171. The control board 172 has an information processor 30 shown in FIG. 1 and can communicate with other systems on a communication line 179. The control board 172 also has an interface section 176 for reading monitor points from a card 173. The information processor 30 has at least a central processing unit (CPU) 30*a* and a memory 30*b* for storing CPU programs and data.

The card 173 is a memory card that can be mounted and demounted on the interface section 176. The card 173 stores at least data indicating pachinko ball monitor points, such as positions of winning holes 14*a*, 14*a*, . . . , propelled ball points (detection positions of pachinko balls propelled into a gaming area 12*a*), and an out hole 15 made in the base board 11 of a pachinko ball machine 10, and a detection algorithm for pachinko balls entering the monitor points as monitor data. The card 173 also stores a propelled ball detection algorithm shown in FIG. 2.

As shown in FIG. 3, the propelled ball points are provided in a portion along the guide rail 12 where pachinko balls bounce into the gaming area 12*a*. Specifically, in FIG. 3, sensing units 20*a* contained in circled regions are set, in which case six propelled ball points SP1, SP2, SP3, SP4, SP5, and SP6 are set. The case in which the propelled ball points are in a one-to-one correspondence with the sensing units 20*a* is most standard, but the invention is not limited to it. For example, one point has the same size as one sensing unit 20*a*, but may be set across two contiguous sensing units. One point can also be made up of four sensing units 20*a*.

The memory mounted on the card can comprise RAM, mask ROM, EPROM, one-shot ROM, etc.

A storage 174 connected to the control board 172 is used to record various items of data such as paths of pachinko balls moving in a space between the base board 11 of the pachinko ball machine 10 and the inner glass panel 17. The storage 174 can be provided by a hard disk storage device, for example. The data recorded in the storage 174 can be loaded into a computer 175 containing software for analyzing pachinko ball paths and performing operations on the data to provide data required for the pachinko ball parlor. All or a part of the data indicating the monitor points and the pachinko ball detection algorithm may be stored in the storage 174.

The transmission circuit 40 is a circuit for transmitting a signal of a predetermined frequency to each transmission line 22 in sequence. The reception circuit 50 is a circuit for receiving a signal from each reception line 26 in sequence in synchronization with the transmission circuit 40. A continuous sine wave of frequency 1–1.3 MHz centering on 0 V is preferred as a voltage waveform applied to the transmission line 22 by the transmission circuit 40.

Figure 7:
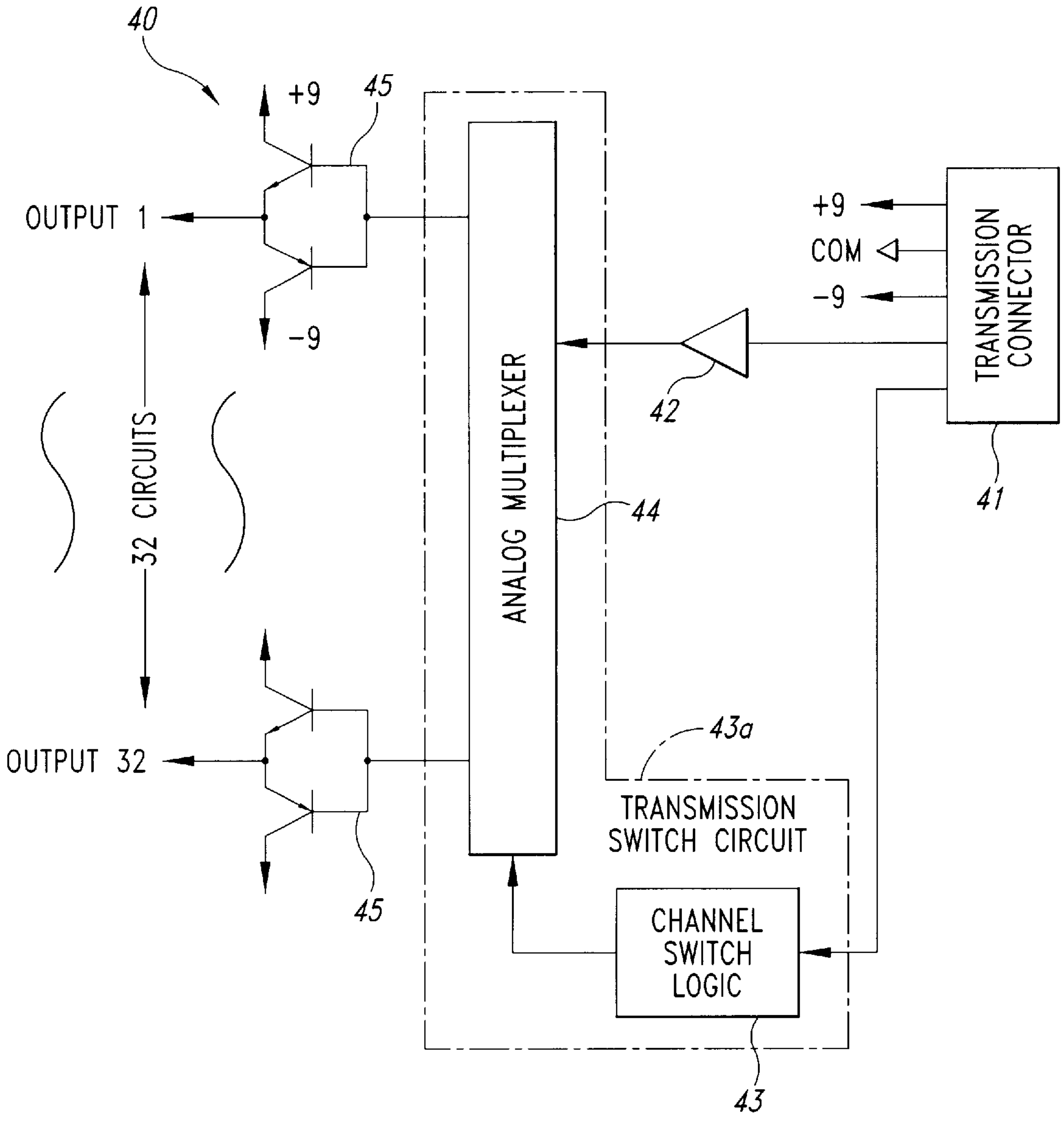
FIG. 7 is a block diagram of a transmission circuit of a transmission/reception board.

As shown in FIG. 7, the transmission circuit 40 consists of a transmission connector 41, an amplifier 42 connected to the transmission connector 41, a transmission line switch circuit 43*a* for switching the transmission line to which a signal current is to be transmitted, in sequence each time a transmission line switch pulse is input, and 32 totem-pole drivers 45 each connected to one end of each of the 32 transmission lines 22 via the transmission connector 67*a*. The transmission line switch circuit 43*a* has channel switch logic 43 and an analog multiplexer 44 being connected to the amplifier 42 and the channel switch logic 43 for switching so as to connect the amplifier 42 to the totem-pole driver 45 corresponding to the specified transmission line 22. Each totem-pole driver 45 comprises an NPN transistor and a PNP transistor, which have emitters connected to each other and bases connected to each other.

Figure 8:
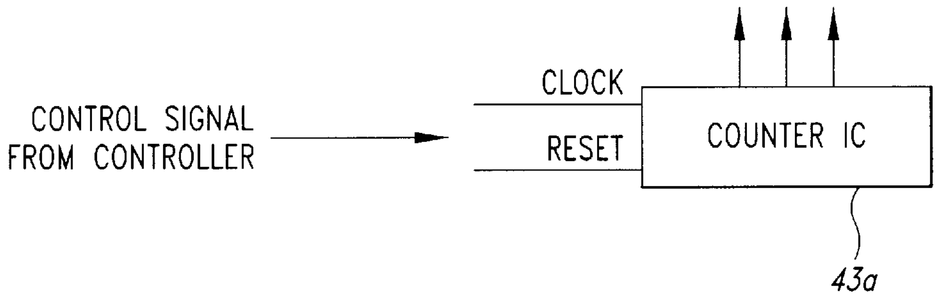
FIG. 8 is a block diagram showing the main part of channel switch logic.

The channel switch logic 43 has a counter IC 43*a* and operates with two control lines for clock and reset, as shown in FIG. 8. Specifically, each time a transmission line switch pulse signal output from a sequence controlling circuit 47 described below is input, the connection state of the analog multiplexer 44 is switched in sequence so as to connect to the specified transmission line.

Figure 9:
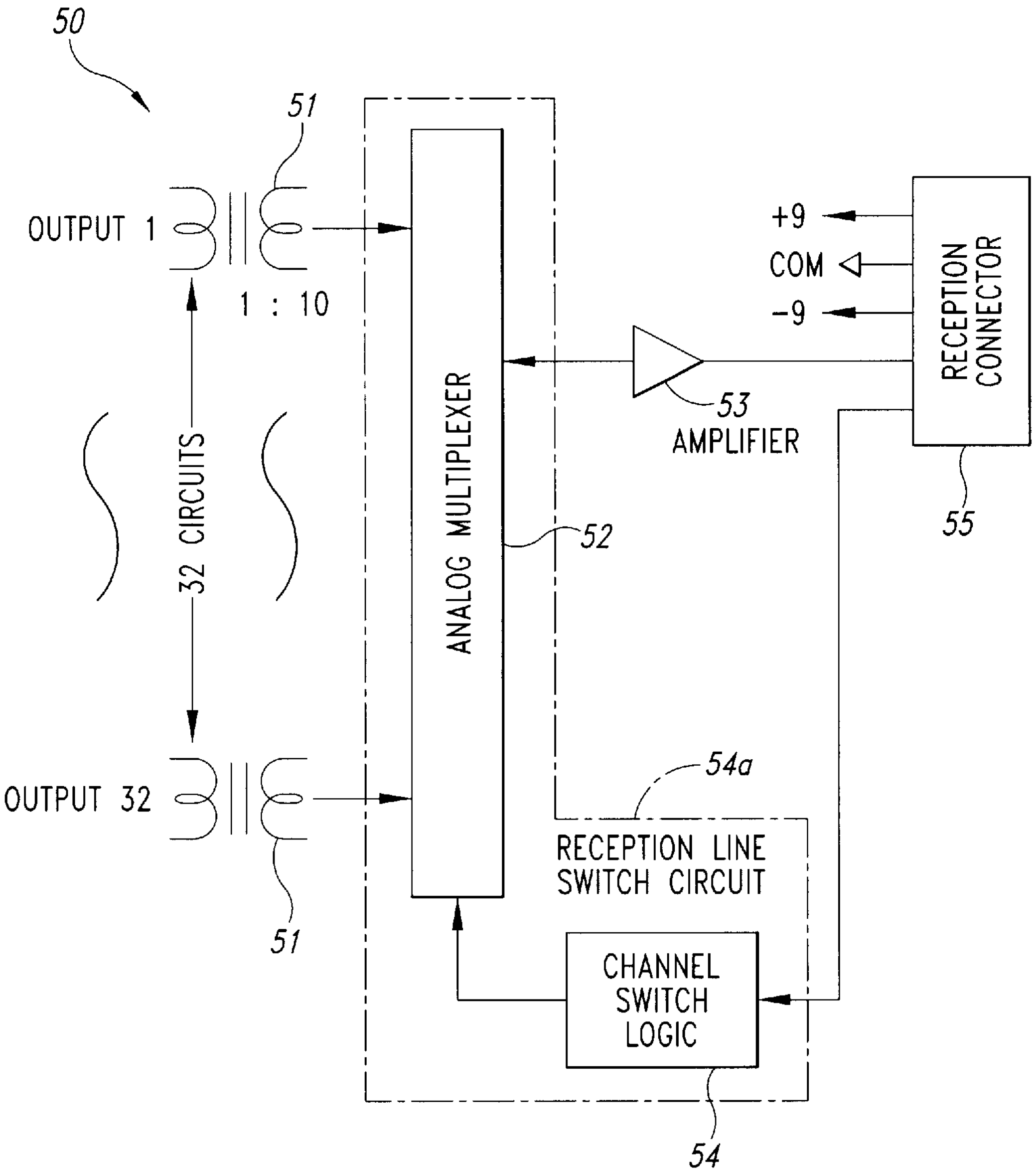
FIG. 9 is a block diagram of a reception circuit of the transmission/reception board.

As shown in FIG. 9, the reception circuit 50 consists of 32 CTs (current transformers) 51 connected to the 32 reception lines 26 via the reception connector 67*b*, a reception line switch circuit 54*a* being connected to the CTs 51 for switching the reception line to be detected in sequence each time a reception line switch pulse is input, an amplifier 53 connected to the reception line switch circuit 54$a$, and a reception connector 55 connected to the amplifier 53 and the reception line switch circuit 54$a$. The reception line switch circuit 54$a$ has an analog multiplexer 52 and a channel switch logic 54 connected to the analog multiplexer 52. Therefore, the reception circuit 50 is adapted to receive a signal from each reception line 26 via each CT 51.

The CT 51 insulates its corresponding reception line from the analog multiplexer 52 and magnifies a signal from the corresponding reception line by 10 times. The analog multiplexer 52 receives signals in sequence from the specified CTs 51 based on a command of the channel switch logic 54. The amplifier 53 amplifies a signal from the analog multiplexer 52.

The channel switch logic 54 has similar elements to those of the channel switch logic 43 of the transmission circuit 40. Each time a reception line switch pulse signal output from the sequence controlling circuit 47 is input (every scanning period), the input switch state of the analog multiplexer 52 is changed on the falling edge of the pulse signal.

Figure 1:
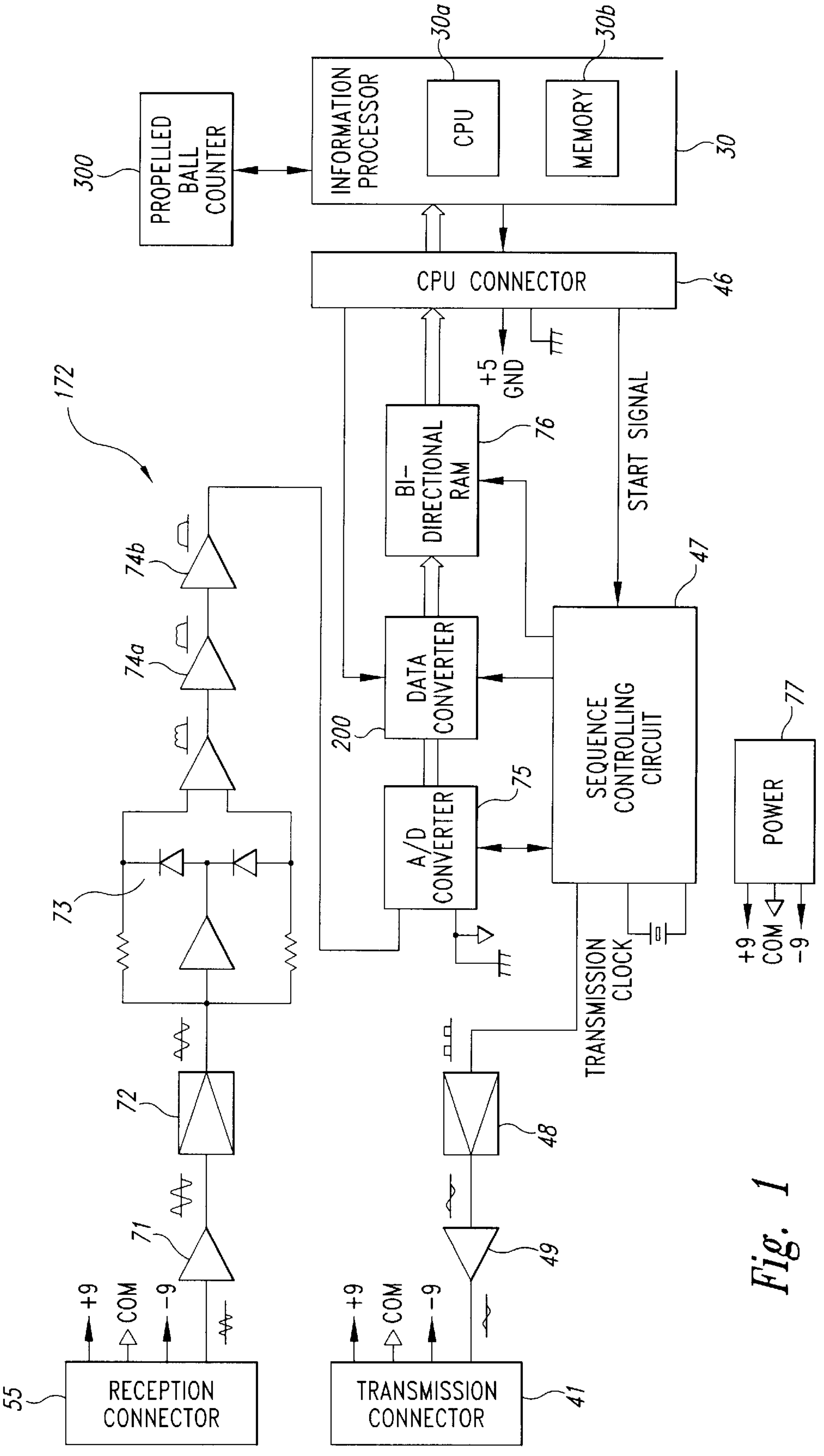
FIG. 1 is a block diagram of reception and transmission circuits of a control board.

As shown in FIG. 1, the control board 172, which contains the information processor 30, has a transmission section comprising a sequence controlling circuit 47 for sending a transmission clock in response to a start signal input from the information processor 30 via a CPU connector 46, a band-pass filter 48 for receiving the transmission clock and outputting a transmission signal, and an amplifier 49 for amplifying the transmission signal and sending the amplified signal to the transmission connector 41. A propelled ball counter 300 for counting propelled balls is connected to the information processor 30.

The control board 172 has a reception section comprising an amplifier 71 for amplifying a reception signal from the reception connector 55, a band-pass filter 72 for receiving the amplified signal, a full-wave rectification amplifier 73 for receiving the reception signal through the band-pass filter 72, two low-pass filters 74$a$ and 74$b$ for receiving the reception signal from the full-wave rectification amplifier 73, an A/D converter 75 for receiving the reception signal through the low-pass filter 74$b$, converting the reception signal into digital data under the control of the sequence controlling circuit 47 and outputting the digital data, a data converter 200 for receiving the digital data as raw data X and converting the raw data X into response data Z representing the presence or absence of an electromagnetic characteristic change (presence or absence of a pachinko ball) at the sensing position, and a bidirectional RAM 76 for writing the response data Z under the control of the sequence controlling circuit 47 and sending the response data Z via the CPU connector 46 to the information processor 30 in response to a read signal from the CPU connector 46.

Even if the matrix sensor 20 responds to the guide rail 12 (metal) on the base board 11, the amplifiers, etc., in the reception section have characteristics set so that an input signal generated by the response does not exceed the input voltage range of the A/D converter 75.

The data converter 200 performs operations of the following expressions (1) and (2) and consists of components such as an arithmetic circuit capable of performing absolute value subtraction, data A and S, and a memory for storing the operation result:

$$Y=|X-X_0| \quad (1)$$

$$Z=Y-S \quad (2)$$

where $X_0$ denotes offset data, which is raw data X in the absence of a pachinko ball, S denotes slice data having a predetermined change width value to remove a ripple of the raw data X, and Y denotes change data containing the ripple.

The bidirectional RAM 76 is controlled by the sequence controlling circuit 47 for storing the response data Z for each sensing unit 20$a$. That is, the response data Z output from the data converter 200 is registered at a predetermined address specified by a signal from the sequence controlling circuit 47. The bidirectional RAM 76 has a capacity of 2048 bytes, for example.

The control board 172 has a power unit 77.

The propelled ball counter 300 is provided to store the number of pachinko balls propelled into the gaming area (number of propelled balls). It counts signals from the information processor 30 for counting the number of propelled balls.

The information processor 30 reads the monitor data, etc., on the card 173 and the response data Z in the bidirectional RAM 76 and relates the response data Z to the monitor data for monitoring pachinko balls. Particularly for the propelled balls, the information processor 30 operates according to a flowchart shown in FIG. 2; it reads the most recent response data Z (sense data) for each propelled ball point stored on the card 173 after a lapse of the wait time and counts up the number of propelled balls in the propelled ball counter 300 according to the value of the response data Z. The wait time should be set to a value longer than the time required for a pachinko ball to pass through the propelled ball points and shorter than the ball propelling period, so as to reliably sense a propelled ball and to ensure it is not counted more than once; preferably, it is about 600 msec as a specific value.

Figure 10:
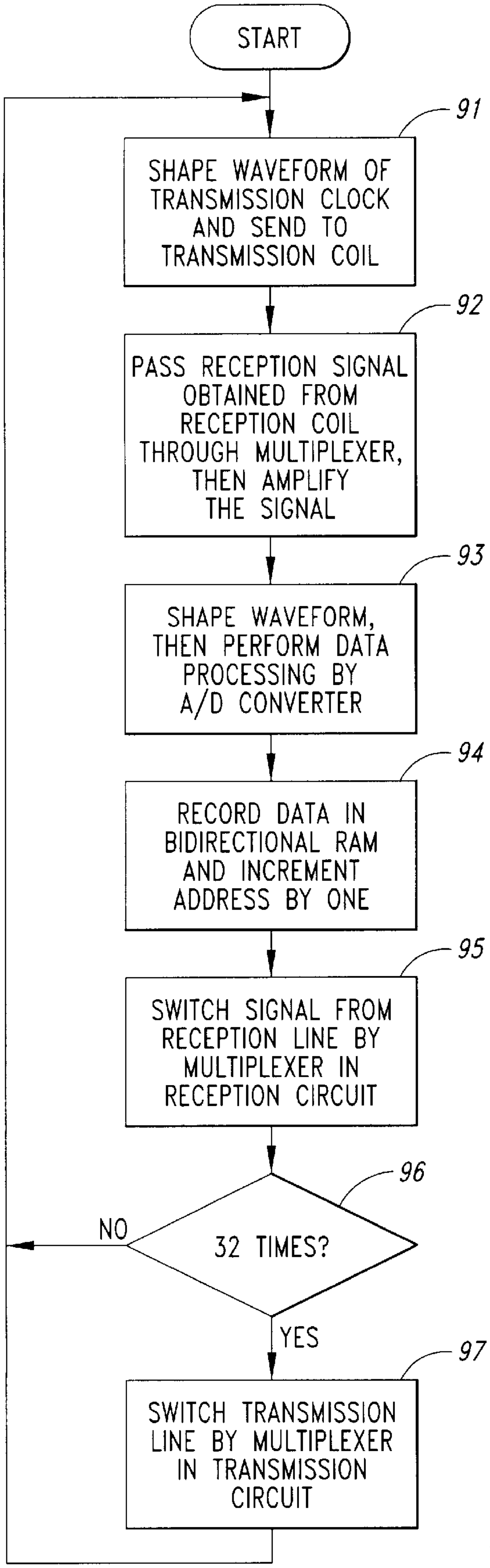
FIG. 10 is a scanning flowchart of the metallic body detecting apparatus.

Next, the operation of the embodiment will be discussed. Address signals and control signals from the information processor 30 are output via the CPU connector 46. FIG. 10 shows a process flow.

First, apparatus adjustments regarding detection of propelled balls will be described. Since various metals such as the pins 13 and the guide rail 12 are placed on the base board 11, the A/D converter 75 is adjusted so that each reception signal from the reception lines near the metals does not become a saturation value in the presence of these metals. The propelled ball points are specified. Normally, five to 10 propelled ball points are set. In the embodiment, SP 1 to SP6 are set as shown in FIG. 3. The propelled ball points can be set for each machine. Normally, the points are written onto the card 173. Such adjustments can be made, for example, when the pachinko ball machine is installed. Readjustments can also be made at proper periods.

When the pachinko ball machine is started, the information processor 30 reads the storage contents of the card 173 into the memory 30$b$.

When a start signal is transmitted from the information processor 30 to the sequence controlling circuit 47, the sequence controlling circuit 47 divides a 16-MHz basic clock in response to a necessary clock frequency for generating and outputting a transmission clock. The waveform of the transmission clock from the sequence controlling circuit 47 is re-shaped from a digital signal into an analog signal through the band-pass filter 48, and then the analog signal is amplified by the amplifier 49 and sent to the transmission connector 41.

Further, the transmission signal is amplified by the amplifier 42 in the transmission circuit 40. The analog multiplexer 44 operates the totem-pole drivers 45 in sequence on channels switched by the channel switch logic 43, whereby the totem-pole drivers 45 output the signal amplified by the amplifier 42 to the transmission lines 22 in sequence (step 91).

Then, electromagnetic induction effect causes an electromotive force to occur on the reception lines 26 crossing the transmission line 22 on which the signal is transmitted. At this time, as a pachinko ball which is metal object approaches a sensing unit 20*a*, the magnitude of the electromotive force (induced current) of the reception line 26 changes in the sensing unit 20*a*.

The reason why it changes is not analyzed clearly at present, but can be considered as follows: First, a pachinko ball, which made of a material consisting essentially of iron, is a ferromagnetic substance. Thus, a magnetic flux occurring on the transmission line 22 and spread into a space converges on the pachinko ball, and the magnetic flux distribution crossing the reception lines changes. Second, an eddy current occurs on the pachinko ball in a direction of canceling the magnetic flux on the transmission line 22. These cause the induced current to change. Which cause is dominant varies depending on the relative positional relationship between the pachinko ball and the transmission line 22 and reception line 26. The magnetic flux crossing the reception line 26 may also increase depending on the relative positional relationship with the pachinko ball. It also varies depending on whether or not metal exists on the background. In any case, only a change needs to be detected.

In the reception section, the reception circuit 50 receives a signal from each reception line 26 via each CT 51 in synchronization with the transmission circuit 40 under the control of the sequence controlling circuit 47. As shown in FIG. 9, a voltage caused by induced current appearing on the reception lines 26 is magnified by 10 times by the CT 51. This eliminates the need to provide an amplifier having a larger amplification in the reception circuit. The CTs 51 insulate the reception lines 26 of the matrix sensor 20 from the analog multiplexer 52 in the reception circuit 50 for preventing noise from entering the reception circuit 50 from the pachinko ball machine 10.

The analog multiplexer 52 switches signals received from the reception lines 26 through the CTs 51 by the channel switch logic 54 and outputs them in sequence. Each signal output from the analog multiplexer 52 is amplified by 100 times by the amplifier 53 (step 92).

The reception signal is amplified and detected via the reception connector 55, the amplifier 71, and the band-pass filter 72. The reception signal passed through the band-pass filter 72 results in an analog signal, which is then shaped by the full-wave rectification amplifier 73. The output signal from the full-wave rectification amplifier 73 is averaged by integration processing through the low-pass filters 74*a* and 74*b*.

Next, the reception signal is sent to the A/D converter 75. The A/D converter 75 converts the signal from the reception line 26 into a digital signal in predetermined bit units, such as 12 bits, and outputs the resultant digital signal (sense data) to the bidirectional RAM 76 for storage under the control of the sequence controlling circuit 47 (step 93).

That is, the sense data is recorded in the bidirectional RAM 76 in response to a write signal from the sequence controlling circuit 47 independently of the operation of the information processor 30, then the address is incremented by one every scanning period based on the clock signal output by the sequence controlling circuit 47, for example, every clock (step 94), and the sense data is stored in a different address for each sensing unit 20*a*.

These steps are repeated every scanning period. That is, the analog multiplexer 52 in the reception circuit 50 switches the signal from each reception line 26 every scanning period at step 95 and the above-mentioned operation is performed 32 times for the 32 reception lines 26 (once for each line). Upon completion at step 96, the analog multiplexer 44 in the transmission circuit 40 switches the current transmission line 22 at step 97. Again, similar processing is repeated 32 times for storing the sense data for each sensing unit 20*a* in different addresses of the bidirectional RAM 76 in sequence in relation to the sensing units 20*a*.

Therefore, the information processor 30 can read the sense data stored in the bidirectional RAM 76 for judging that a pachinko ball exists at what time, and at what position (sensing unit 20*a*) under any desired retrieval conditions whenever necessary, independently of the above-mentioned detection signal processing.

Thus, the CPU 30*a* of the information processor 30 can read the sense data recorded in the bidirectional RAM 76 into the memory 30*b* using a read start signal, as required, perform operations on the read sense data, and compare the sense data with the pachinko ball monitor data stored on the card 173 for monitoring pachinko balls.

Figure 2:
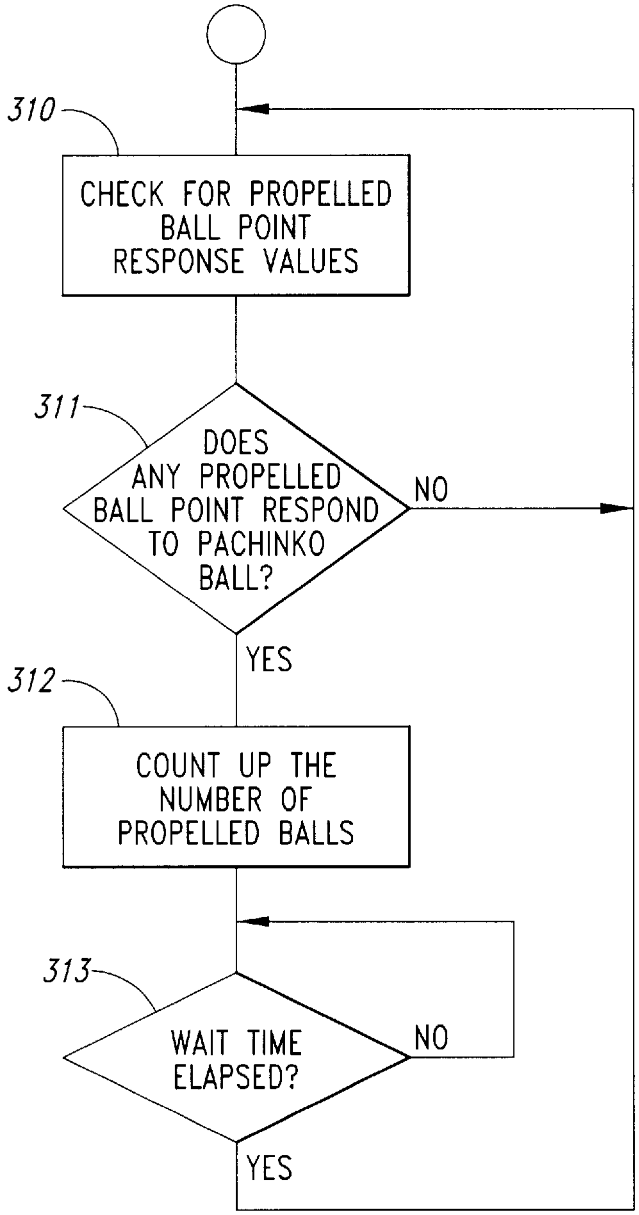
FIG. 2 is a flowchart showing the counting process of a propelled balls.

Particularly, it counts the number of propelled balls by repeating the operation shown in FIG. 2. That is, the CPU 30*a* reads the most recent response data Z about each of the propelled ball points SP1–SP6 stored on the card 173 and stores the data in the memory 30*b* at step 310. Next, it retrieves the sense data read into the memory 30*b* and collects the response data Z on each propelled ball point, then determines whether the values are all 0. If not all the values are 0, the CPU 30*a* goes to step 312 at which it counts up the value of the propelled ball counter 300. The CPU 30*a* waits for the predetermined wait time at step 313 before again repeating the steps starting at step 310.

Thus, in the embodiment, passage of a pachinko ball may be detected at any of the propelled ball points SP1–SP6; even if a pachinko ball is propelled at high speed, the probability that it can be detected at any point is increased, so that a propelled ball detection error can be decreased and a propelled ball count error can also be lowered. Particularly, if the propelled ball points SP1–SP6 are arranged along the pachinko ball path along the guide rail 12, pachinko balls pass through all propelled ball points SP1–SP6, further increasing the pachinko ball detection probability.

Therefore, the pachinko ball detecting apparatus always registers the number of propelled balls accurately in the propelled ball counter 300 in real time, and useful data for management of pachinko ball machines can be provided by reading the counter value whenever required.

The embodiment stores the propelled ball points on the card 173, which can provide propelled ball points for new machines to enable rapid and easy pachinko ball machine replacement. However, the invention is not limited to this arrangement. The propelled ball points may be stored in any other storage medium, such as the memory 30*b*.

Although the embodiment collects data about the propelled ball points set on the guide rail, a sequence controlling circuit (see FIG. 11) for controlling the operation of transmission or reception lines of a matrix sensor may be provided for scanning only specific transmission or reception lines, or a combination of specific transmission and reception lines containing the propelled ball points, as in a second embodiment discussed later. This configuration makes it possible to shorten the time taken for matrix sensor scanning.

According to the embodiment, propelled balls can be reliably detected and a propelled ball detection error can be decreased; therefore, a propelled ball count error can also be lowered. The number of propelled balls can always be registered accurately in the propelled ball counter in real time, and useful data for the management of pachinko ball machines can be provided by reading the counter value whenever required.

Next, a second embodiment of the invention will be discussed with reference to the accompanying drawings.

Figure 19:
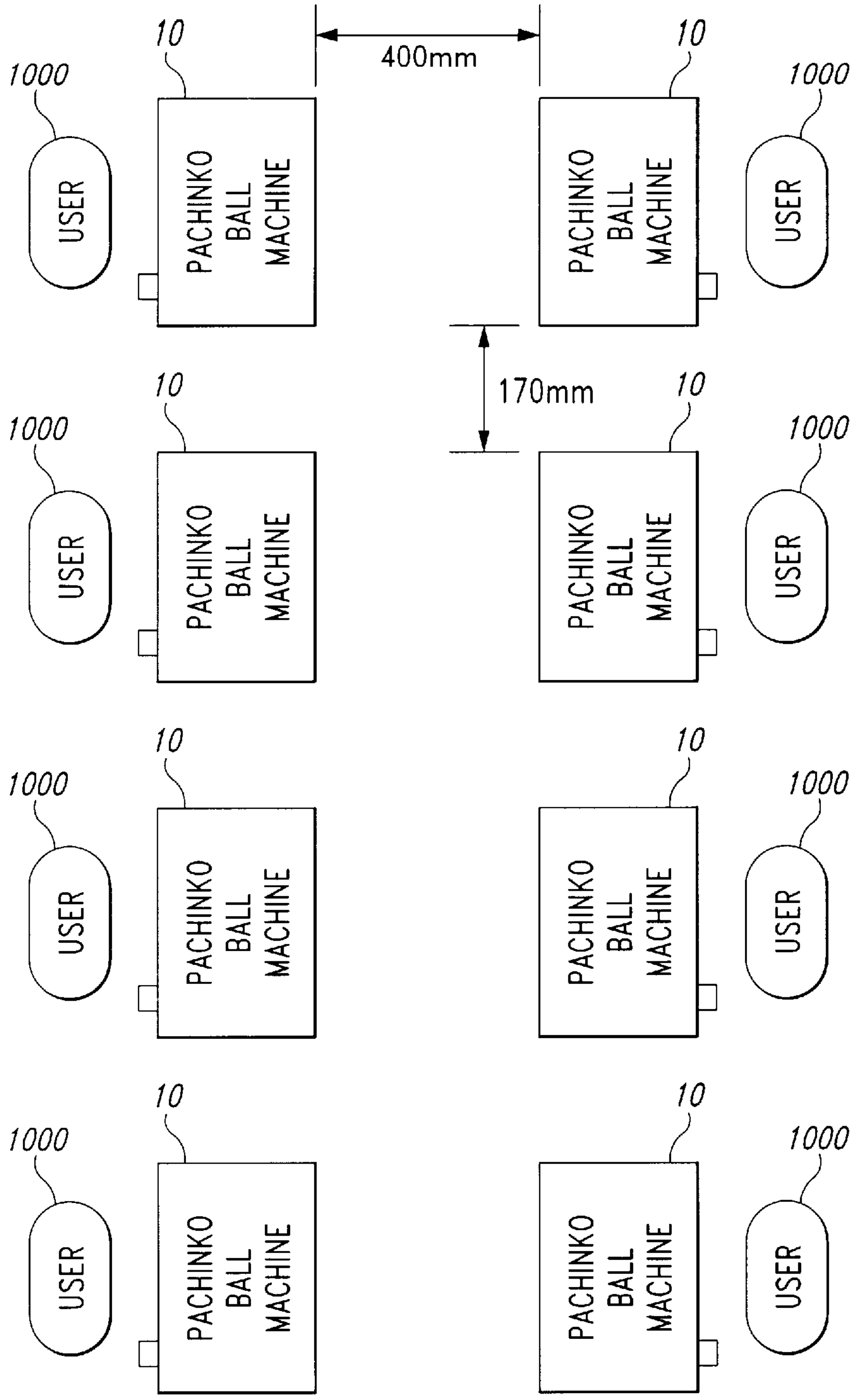
FIG. 19 is a layout example of pachinko ball machines in a pachinko ball parlor.

The second embodiment assumes that pachinko ball machines 10, on which a metallic body detecting apparatus of the embodiment is mounted, are normally placed in a pachinko ball parlor as shown in FIG. 19. Two rows of contiguous pachinko ball machines 10 facing in opposite directions are placed for the convenience of users 1000. Further, the pachinko ball parlor has several pachinko ball machine 10 groups each placed in such an arrangement as an island. FIG. 19 shows the general distance between gaming machines 10 facing in opposite directions and the general interval between contiguous gaming machines 10 in the same row.

Figure 15:
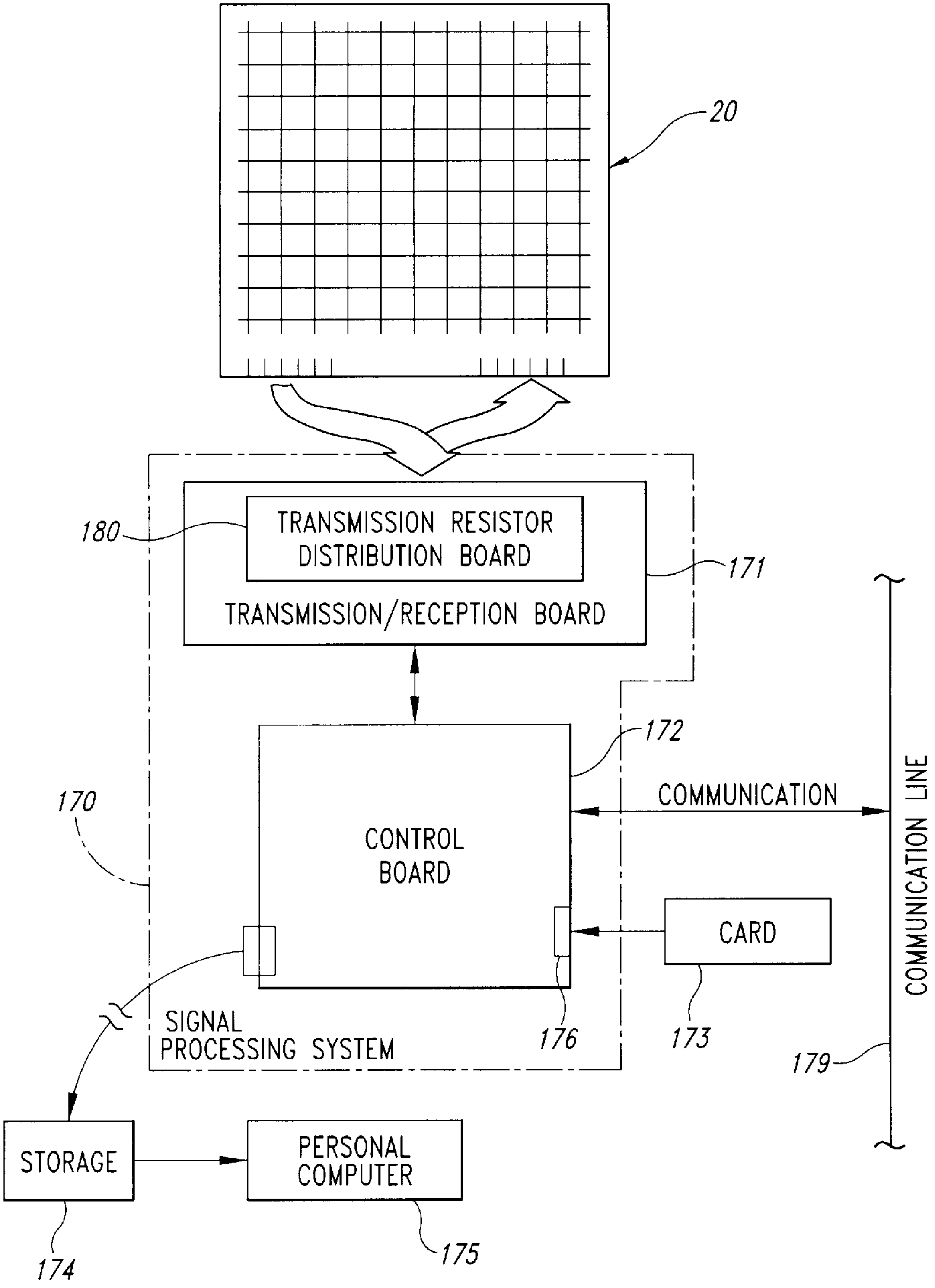
FIG. 15 is a block diagram showing the configuration of the second embodiment of the invention.

The metallic body detecting apparatus of the embodiment comprises a matrix sensor 20 having a detection area spreading like a plane and functioning as a metal sensor and a signal processing system 170 which drives the matrix sensor 20 for sensing the presence of a metallic body and detecting the position thereof, as shown in FIG. 15. The invention is characterized by the fact that the signal processing system 170 contains a transmission resistance distribution board 180 for decreasing the electromagnetic effect on the outside.

Figure 13:
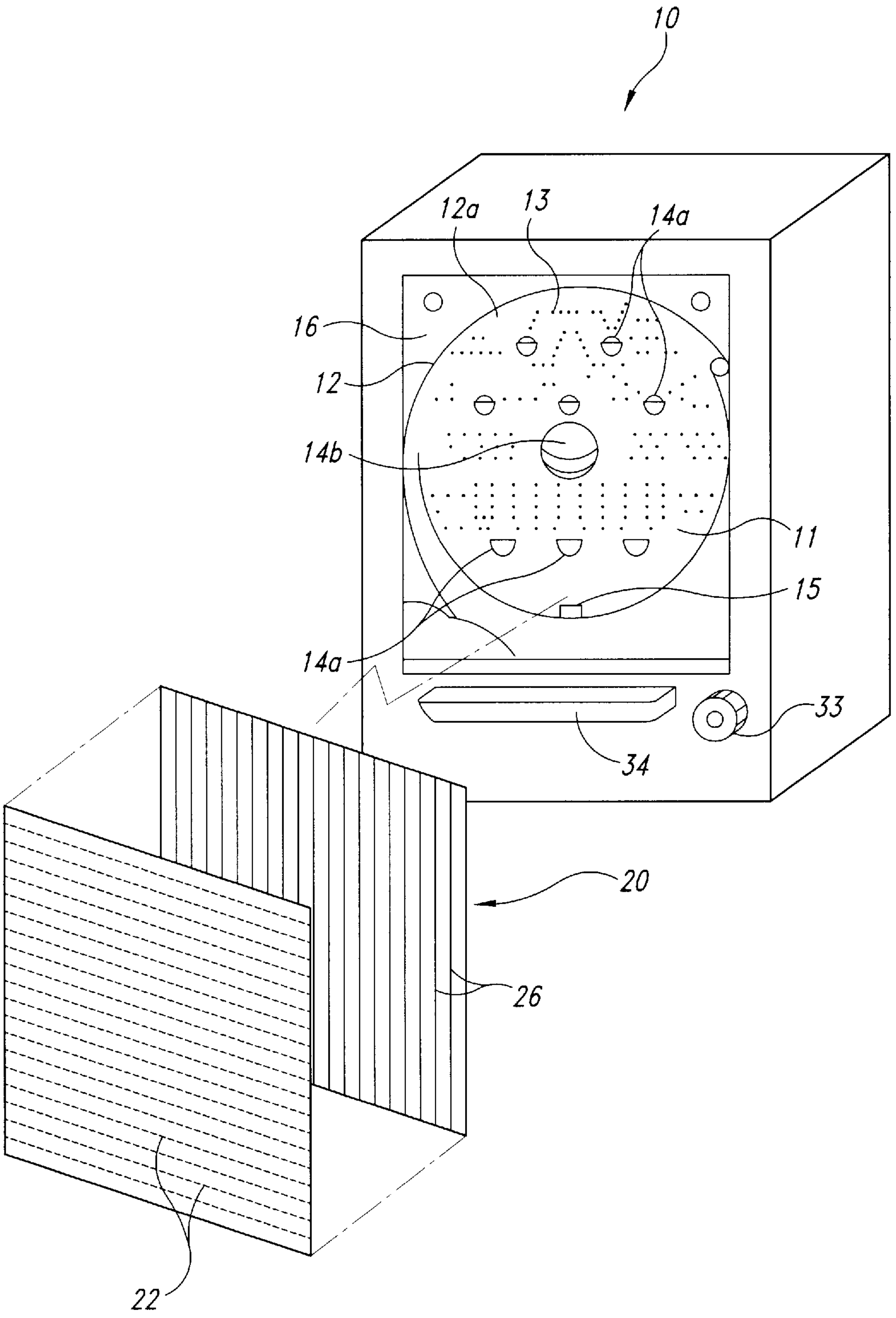
FIG. 13 is a perspective view showing another example of a pachinko ball machine to which a metallic body detecting apparatus of the invention is applied.

That is, instead of providing the propelled ball points for detecting propelled balls in the first embodiment, the second embodiment selects a transmission line for transmitting a transmission signal, thereby detecting pachinko balls more effectively and decreasing the electromagnetic effect on the outside (see FIG. 13).

Figure 14:
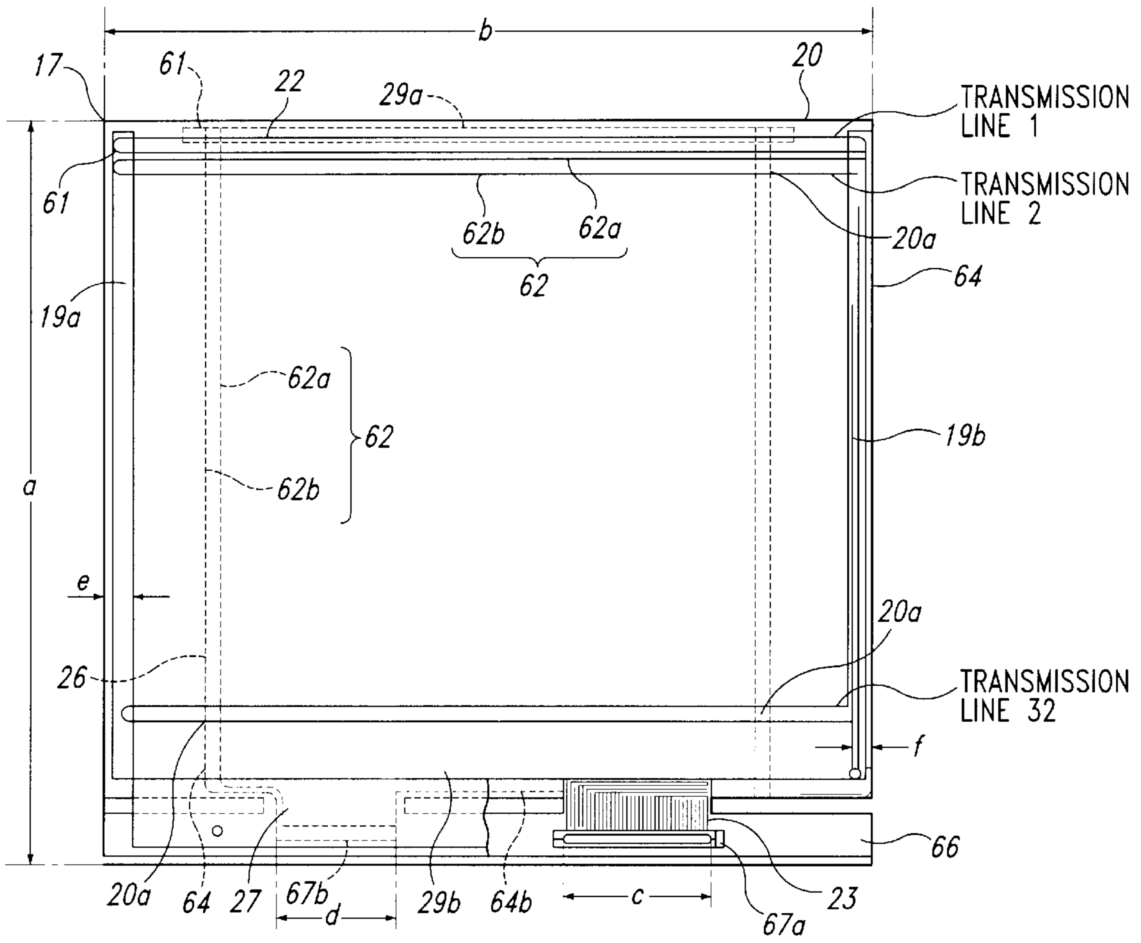
FIG. 14 is a front view showing a matrix sensor.

The embodiment uses the matrix sensor 20 of the same configuration as in the first embodiment. That is, the matrix sensor 20 has a plurality of transmission lines 22, a plurality of reception lines 26, and a board for supporting the lines, as shown in FIG. 14. Each of the transmission lines 22 consists of a pair of conductors 62 forming a going way **62*a* and a returning path 62*b*, which are parallel. Likewise, each of the reception lines 26 consists of a pair of conductors 62 forming a sending path 62*a* and a returning path 62*b*** which are parallel.

The transmission lines 22 and the reception lines 26 are placed so as to cross each other. Specifically, for example, the transmission lines 22 are arranged at given intervals in a row direction and the reception lines 26 are arranged at given intervals in a column direction. The transmission lines 22 and the reception lines 26 are placed in such a manner, providing the intersections of the transmission lines 22 and the reception lines 26 like a matrix as sensing regions. Either the transmission lines 22 or the reception lines 26 may be placed in the row or column direction as desired.

Figure 17:
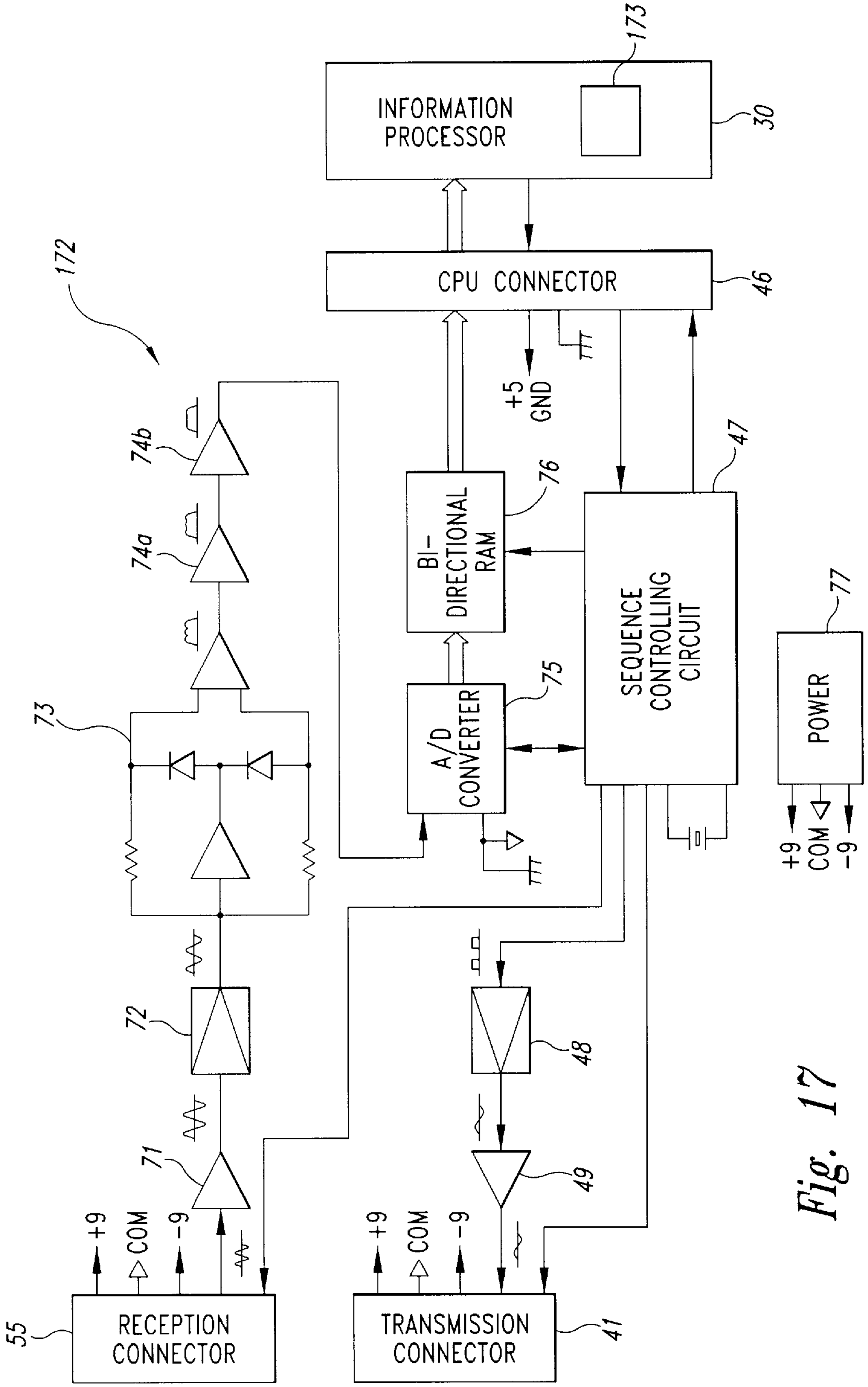
FIG. 17 is a block diagram showing the configuration of a control board.

The signal processing system 170 has a transmission/reception board 171 functioning as transmission/reception means for driving the matrix sensor 20 and a control board 172 functioning as signal processing means for controlling the transmission/reception board 171 for receiving a detection signal and determining whether or not a metallic body exists based on the detection signal, and detecting the metallic body sensing position when a metallic body exists, as shown in FIG. 17.

The transmission/reception board 171 has a transmission circuit 40 for scanning the specified lines of the transmission lines 22 in sequence and sending a transmission signal thereto, a transmission resistance distribution board 180 (see FIG. 16) for limiting transmission current of each of the lines, and a reception circuit 50 for scanning the specified lines of the reception lines 26 in sequence and capturing reception signals of the reception lines in sequence, as described below.

The control board 172 specifies the transmission and reception lines to be scanned for the transmission/reception board 171, determines whether or not a metallic body exists from a signal received at the reception circuit 50, and detects the metallic body sensing position based on information indicating the transmission line scanning position at the transmission circuit 40 and information indicating the reception line scanning position at the reception circuit 50.

The transmission resistance distribution board 180 has 32 resistors 1801 to 1832 for separately limiting the transmission current corresponding to each transmission line.

In the embodiment, the resistance values of the resistors are:

Resistor 1801 (corresponding to transmission output 1): 91 Ω

Resistor 1802 (corresponding to transmission output 2): 39 Ω

Resistors 1803–1831 (corresponding to transmission outputs 3–31): 2.4 Ω

Resistor 1832 (corresponding to transmission output 32): 51 Ω

The transmission outputs are connected to the transmission lines in such a manner that transmission output 1 is connected to transmission line I placed on the top of the matrix sensor 20 and transmission output 32 is connected to transmission line 32 placed on the bottom of the matrix sensor 20, as shown in FIG. 14.

The control board 172 can store information indicating the presence position of a pachinko ball in time sequence, for finding the moving path of the pachinko ball. From the moving path, the characteristics of the machine using the metallic body can be ascertained and an abnormal path can also be detected for judging whether or not illegal operation has been performed.

Next, the signal processing system which processes signals of the matrix sensor 20 will be discussed.

As shown in FIG. 15, the matrix sensor 20 is placed under the control of the control board 172 spaced from the matrix sensor 20 via the transmission/reception board 171. The control board 172 has an information processor 30 shown in FIG. 17 and can communicate with other systems on a communication line 179. The control board 172 also has an interface section 176 for reading monitor points from a card 173. The information processor 30 has at least a central processing unit and a memory for storing CPU programs and data.

The card 173 is a memory card that can be mounted and demounted on the interface section 176. The card 173 stores at least data indicating pachinko ball monitor points such as detection positions of pachinko balls propelled into winning holes **14*a*, 14*a*, . . . and a gaming area provided on the base board 11 of a pachinko ball machine 10, and the position of an out hole 15, as well as a detection algorithm of pachinko balls entering the winning holes 14*a*, 14*a*, . . . and the out hole 15 as monitor data. In the embodiment, the card 173** further stores scan information specifying the transmission and reception lines to be scanned.

The memory mounted on the card can use RAM, mask ROM, EPROM, one-shot ROM, etc.

A storage 174 connected to the control board 172 is used to record paths of pachinko balls moving in a space between the base board 11 of the pachinko ball machine 10 and the inner glass panel 17. The storage 174 can be provided by a hard disk storage device, for example. The data recorded in the storage 174 can be loaded into a computer 175 containing software for analyzing pachinko ball paths and performing operations on the data to provide data required for the pachinko ball parlor. All or a part of the data indicating the monitor points, the pachinko ball detection algorithm, and scan information may be stored in the storage 174.

The transmission circuit 40 is a circuit for transmitting a signal of a predetermined frequency to each transmission line 22 in sequence. The reception circuit 50 is a circuit for receiving a signal from each reception line 26 in sequence in synchronization with the transmission circuit 40. A continuous sine wave of frequency 1–1.3 MHz centering on 0 V is preferred as a voltage waveform applied to the transmission line 22 by the transmission circuit 40.

Figure 16:
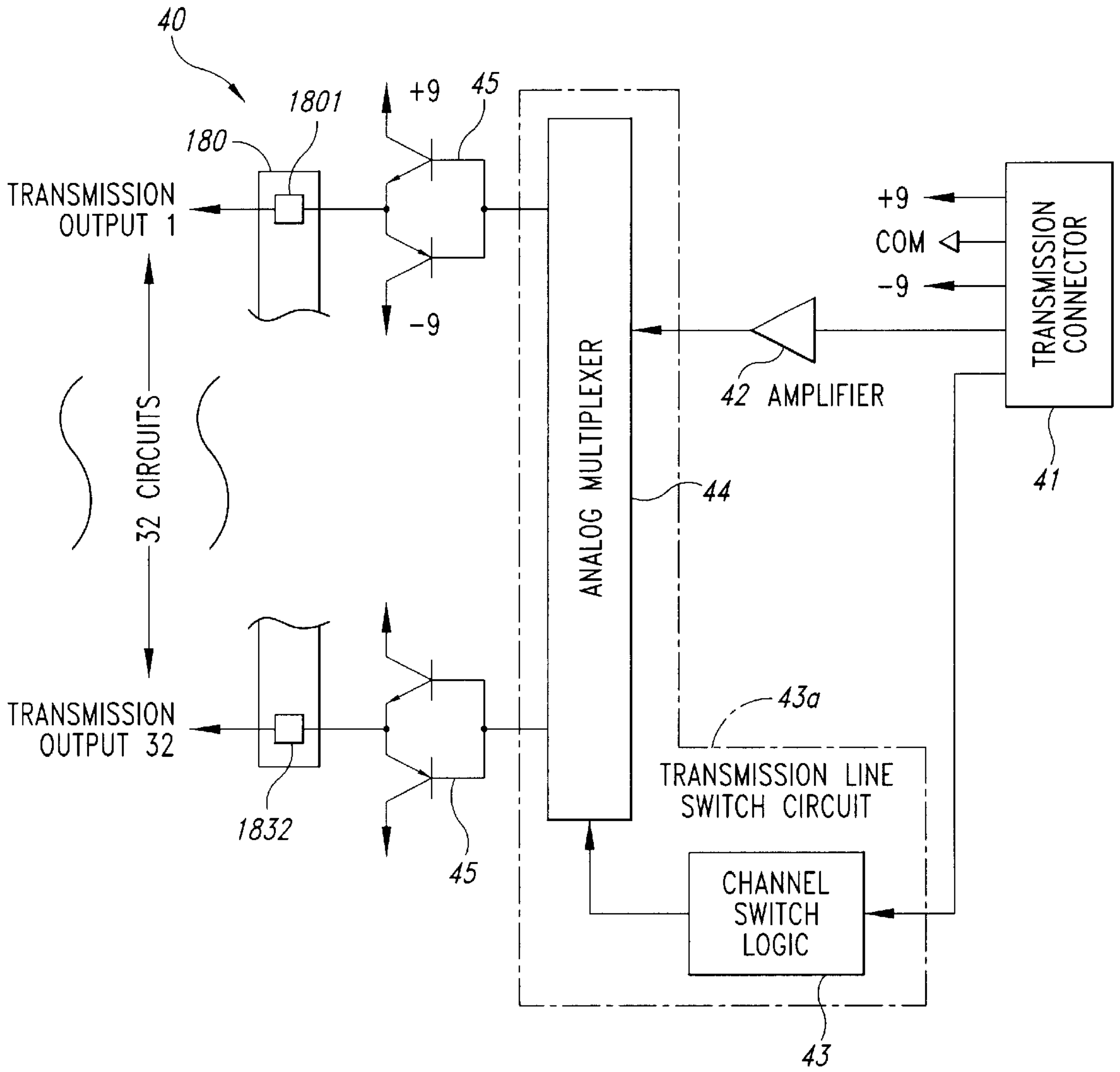
FIG. 16 is a block diagram of a transmission circuit of a transmission/reception board.

As shown in FIG. 16, the transmission circuit 40 is provided by adding the transmission resistance distribution board 180 for decreasing the electromagnetic effect on the outside to the configuration of the transmission circuit of the first embodiment.

That is, the transmission circuit 40 of the second embodiment consists of a transmission connector 41, an amplifier 42 connected to the transmission connector 41, a transmission line switch circuit 43*a* for switching the transmission line to which a signal current is to be transmitted in sequence each time a transmission line switch pulse is input, and 32 totem-pole drivers 45 each connected to one end of each of the 32 transmission lines 22 via the transmission connector 67*a*. The transmission line switch circuit 43*a* has a channel switch logic 43 and an analog multiplexer 44 being connected to the amplifier 42 and the channel switch logic 43 for switching so as to connect the amplifier 42 to the totem-pole driver 45 corresponding to the specified transmission line 22. Each totem-pole driver 45 comprises an NPN transistor and a PNP transistor, which have emitters connected to each other and bases connected to each other.

Outputs of the totem-pole drivers 45 in the transmission circuit 40 having the configuration are connected to inputs of their respective corresponding resistors 1801–1832 on the transmission resistance distribution board 180.

The second embodiment uses the reception circuit 50 and the channel switch logic 43 having the same configurations as the reception circuit (see FIG. 9) and the channel switch logic (see FIG. 8) in the first embodiment, which will not be discussed again.

As shown in FIG. 17, the control board 172, which contains the information processor 30, has a transmission section comprising a sequence controlling circuit 47 for sending a transmission clock in response to a start signal input from the information processor 30 via a CPU connector 46, a band-pass filter 48 for receiving the transmission clock and outputting a transmission signal, and an amplifier 49 for amplifying the transmission signal and sending the amplified signal to the transmission connector 41.

The control board 172 has a reception section comprising an amplifier 71 for amplifying a reception signal from the reception connector 55, a band-pass filter 72 for receiving the amplified signal, a full-wave rectification amplifier 73 for receiving the reception signal through the band-pass filter 72, two low-pass filters 74*a* and 74*b* for receiving the reception signal from the full-wave rectification amplifier 73, an A/ID converter 75 for receiving the reception signal through the low-pass filter 74*b*, converting the reception signal into digital data under the control of the sequence controlling circuit 47, and outputting the digital data, and a bidirectional RAM 76 for writing the digital data under the control of the sequence controlling circuit 47 and sending the data via the CPU connector 46 to the information processor 30 in response to a read signal from the CPU connector 46.

The control board 172 has a power unit 77. The bidirectional RAM 76 has a capacity of 2048 bytes, for example.

The sequence controlling circuit 47 has a function of outputting a basic clock used as a source of a signal input to each transmission line 22 and a function of outputting the reception line switch pulse signal (first timing signal) for controlling the channel switch logic 54 and the above-mentioned transmission line switch pulse signal (second timing signal) for controlling the channel switch logic 43.

Figure 11:
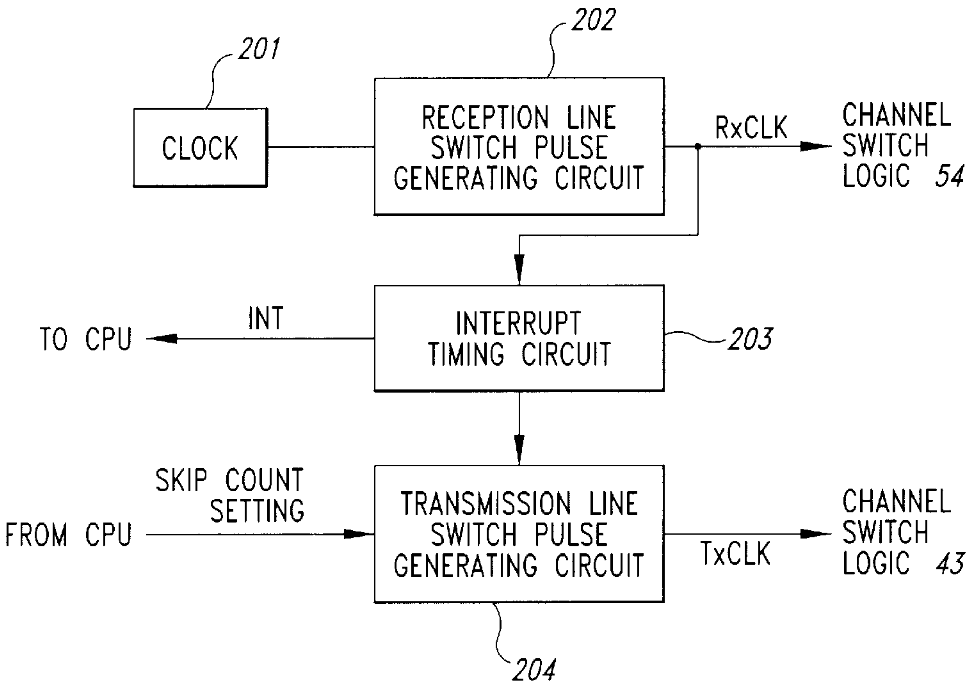
FIG. 11 is a block diagram showing the configuration of a sequence controller used in an embodiment of the invention.

That is, as shown in FIG. 11, the sequence controlling circuit 47 comprises a clock circuit 201 for outputting a basic clock signal, a reception line switch pulse generator 202 for dividing the basic clock from the clock circuit 201 to output a reception line switch pulse signal (RXCLK in FIG. 12) every scanning period, for example, every basic clock, an interrupt pulse signal generator 203 for further dividing the output of the reception line switch pulse generator 202 for forming two pulses each time all reception lines 26 are switched (each time 32 reception line switch pulses are output) and generating two interrupt pulse signals (INT in FIG. 12) on the rising edges of the two pulses, and a transmission line switch pulse generator 204 for outputting as many transmission line switch pulses (TXCLK in FIG. 12; each having an extremely short pulse width compared with the reception line switch pulse signal) as the skip count specified by the information processor 30 on the rising edge of every other interrupt pulse.

The sequence controlling circuit 47 has a circuit (not shown) for dividing the basic clock to output the transmission clock.

Figure 12:
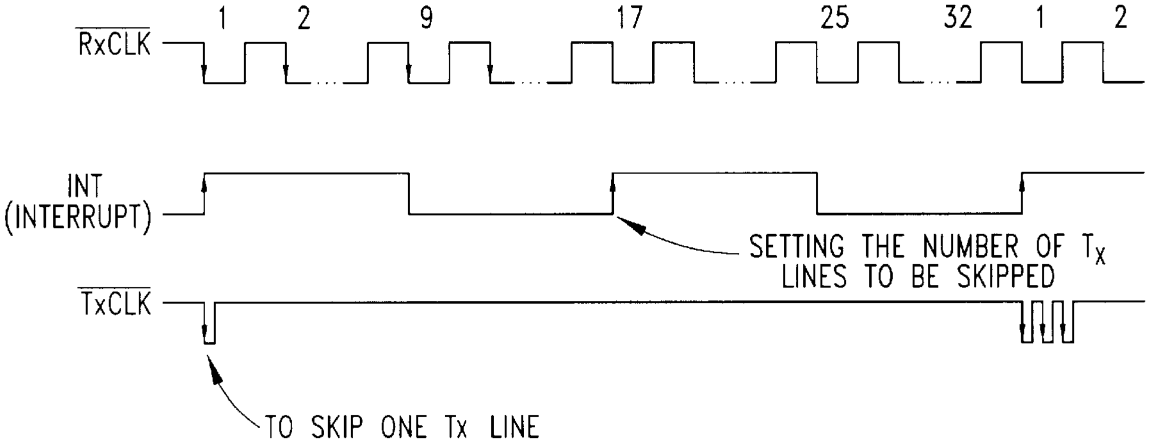
FIG. 12 is a waveform chart of control signals output from the sequence controller.

In the detection operation, the information processor 30 reads the above-mentioned scan information from the card 173 (storage medium), receives the interrupt pulse signal INT from the interrupt pulse signal generator 203, and sets a new skip count in the transmission line switch pulse generating circuit 204 each time all reception lines 26 are switched. That is, if the next transmission line ready to transmit an input signal does not receive transmission specification in the course of switching a sequence of the reception lines 26, in the embodiment, at the time of switching to the 17th reception line or on the rising edge of the interrupt pulse signal INT as shown in FIG. 12, the information processor 30 instructs the transmission line switch pulse generator 204 to skip the transmission line. If continuous transmission lines are not used for signal detection, the information processor 30 instructs the transmission line switch pulse generator 204 to skip these transmission lines.

The transmission line switch pulse generator 204 outputs the transmission line switch pulse signal TXCLK in the interrupt pulse period next to the skip setting (in FIG. 12, at the timing of switching to the first reception line). At the time, if the next transmission line is not skipped, one pulse is output, thereby switching the current transmission line to the next transmission line. However, if the next transmission line is to be skipped, the transmission line switch pulse signal TXCLK is successively output, thereby switching the current transmission line to the next next transmission line; the next transmission line on which a transmission signal should be transmitted is skipped. Therefore, the transmission line switch pulse generator 204 outputs one pulse of the transmission line switch pulse signal TXCLK for switching the current transmission line to the next transmission line or (n+1) pulses of the transmission line switch pulse signal TXCLK for skipping one or more successive signal lines, where n is the number of signal lines to be skipped.

The information processor 30 is also programmed so as to read monitor area data registered on the card 173 and sense data stored in the bidirectional RAM 76 and compare the sense data with the monitor area data of pachinko balls for monitoring pachinko balls, independently of the detection operation under the control of the sequence controlling circuit 47 or the information processor 30.

Next, the operation of the embodiment will be discussed.

Address signals and control signals from the information processor 30 are output via the CPU connector 46. First, an example in which all transmission lines are scanned will be discussed. The basic process flow in the example is the same as the flow in the first embodiment (see FIG. 10).

That is, when a start signal is transmitted from the information processor 30 to the sequence controlling circuit 47, the sequence controlling circuit 47 divides a 16-MHz basic clock in response to a necessary clock frequency, to generate and output a transmission clock. The waveform of the transmission clock from the sequence controlling circuit 47 is shaped from a digital signal into an analog signal through the band-pass filter 48, then the analog signal is amplified by the amplifier 49 and sent to the transmission connector 41.

Further, the transmission signal is amplified by the amplifier 42 in the transmission circuit 40. The analog multiplexer 44 operates the totem-pole drivers 45 in sequence on channels switched by the channel switch logic 43, whereby the totempole drivers 45 output the signal amplified by the amplifier 42 to the transmission lines 22 in sequence (step 91).

Then, an electromagnetic induction effect causes an electromotive force to occur on each reception line 26 crossing the transmission line 22 on which the signal is transmitted. At that time, as a pachinko ball which is metal approaches a sensing unit 20*a*, the magnitude of the electromotive force (induced current) of the reception line 26 changes in the sensing unit 20*a* for the reason discussed in the first embodiment.

To use pachinko ball machines 10 in the second embodiment, two rows of contiguous pachinko ball machines are normally placed facing each other in a pachinko ball parlor, as shown in FIG. 19. Therefore, if the spacing of the gaming machines 10 is made narrow, when a signal is transmitted to any of the transmission lines 22, not only the gaming machine 10 main unit, but also the gaming machines 10 contiguous with or facing the gaming machine 10 may be affected, causing mutual interference.

To decrease the mutual interference, the embodiment uses the transmission resistance distribution board 180 as described above for setting transmission output currents of the top two transmission lines 1 and 2 and the bottom transmission line 32 lower than output currents of other transmission lines by means of resistors 1801, 1802, and 1832.

This resistor combination is selected experimentally as the most effective combination. The reason why the combination is optimum is not clearly known. However, it is considered in the gaming machine 10 having the detecting apparatus of the embodiment that the effect from the transmission lines 22 positioned at the top and bottom leaks most easily from the apparatus to the outside, from their positional relationship. Therefore, it is considered that the electromagnetic effect is reduced by limiting the output currents of the transmission lines.

If, unlike the embodiment, the positional relationship between the transmission lines 22 and the reception lines 26 in the matrix sensor 20 becomes opposite, the resistors for limiting the output currents of the transmission lines 22 placed on the rightmost and leftmost sides are set so as to lower the output currents compared with transmission currents to other transmission lines; as in the embodiment, thereby decreasing the electromagnetic effect on the outside.

Coils, etc., may be used to limit transmission impedance rather than using resistors to limit transmission current as in the embodiment.

Figure 18:
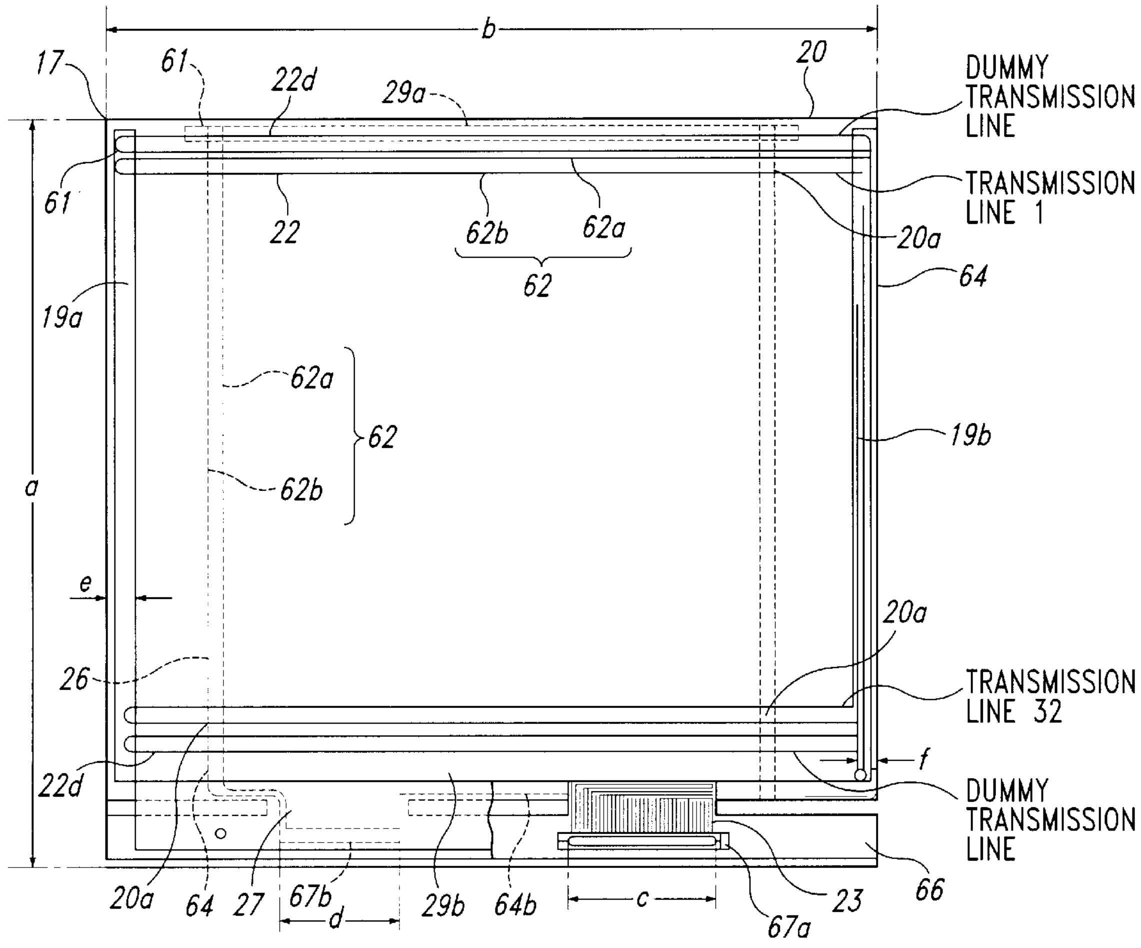
FIG. 18 is a front view showing a matrix sensor having dummy transmission lines placed on ends thereof.

Without limiting transmission current as in the embodiment, a dummy line 22*d* can also be placed on the upper and lower ends of the transmission lines for absorbing the effect on the outside, produced from the end transmission lines 1 and 32, as shown in FIG. 18.

In the reception section, the reception circuit 50 receives a signal from each reception line 26 via each CT 51 in synchronization with the transmission circuit 40 under the control of the sequence controlling circuit 47. As described in the first embodiment, voltage caused by induced current appearing on the reception lines 26 is magnified by 10 times by the CT 51. Since magnification is done by the CT 51, the need to design an amplifier having a large amplification factor in the reception circuit is eliminated. The CTs 51 insulate the reception lines 26 of the matrix sensor 20 from the analog multiplexer 52 in the reception circuit 50 to prevent noise from entering the reception circuit 50 from the pachinko ball machine 10.

The analog multiplexer 52 switches signals received from the reception lines 26 through the CTs 51 by the channel switch logic 54 and outputs them in sequence. Each signal output from the analog multiplexer 52 is amplified by 100 times by the amplifier 53 (step 92).

The reception signal is amplified and detected via the reception connector 55, the amplifier 71, and the band-pass filter 72. The reception signal passed through the band-pass filter 72 results in an analog signal, which is then shaped by the full-wave rectification amplifier 73. The output signal from the full-wave rectification amplifier 73 is averaged by integration processing through the low-pass filters 74*a* and 74*b*.

Next, the reception signal is sent to the A/D converter 75. The A/D converter 75 converts the signal from the reception line 26 into a digital signal in predetermined bit units, such as 12 bits, and outputs the resultant digital signal (sense data) to the bidirectional RAM 76 for storage under the control of the sequence controlling circuit 47 (step 93).

That is, the sense data is recorded in the bidirectional RAM 76 in response to a write signal from the sequence controlling circuit 47 independently of the operation of the information processor 30, then the address is incremented by one every scanning period based on the clock signal output by the sequence controlling circuit 47, for example, every clock (step 94), and the sense data is stored at a different address for each sensing unit 20*a*.

These steps are repeated every scanning period. That is, the analog multiplexer 52 in the reception circuit 50 switches the signal from each reception line 26 every scanning period at step 95 and the above-mentioned operation is performed 32 times for the 32 reception lines 26 (one for each line) at step 96. Then, the analog multiplexer 44 in the transmission circuit 40 switches the current transmission line 22 at step 97. Again, similar processing is repeated 32 times for storing the sense data for each sensing unit 20*a* in different addresses of the bidirectional RAM 76 in sequence in relation to the sensing units 20*a*.

Therefore, the information processor 30 can read the sense data stored in the bidirectional RAM 76 for judging that a pachinko ball exists, at what time and at what position (sensing unit 20*a*), under any desired retrieval conditions, whenever necessary, independently of the above-mentioned detection signal processing.

Thus, the information processor 30 can read the sense data recorded in the bidirectional RAM 76 by a read start signal, as required, perform operations on the read sense data, and compare the sense data with the pachinko ball monitor data stored in the card 173 for monitoring pachinko balls.

The operation is repeated every scanning period.

Next, an example in which a transmission signal is not sent to some of the transmission lines 22 will be discussed.

In order not to send a transmission signal, information indicating lines to which no transmission signal is to be sent, namely, lines not to be scanned needs to be specified. The specification may be either specification of lines not to be scanned or of lines to be scanned.

A combination of transmission and reception lines to be scanned may also be specified for intensively monitoring only the area covered by the combination. For example, though propelled ball points are specified for monitoring propelled pachinko balls in the first embodiment, a scan area can also be specified in such a manner for monitoring propelled balls.

In the second embodiment, an example in which the card 173 provides the signal processing system with scan information specifying the transmission lines 22 to be scanned will be discussed.

The transmission lines 22 for which detection is not specified in the scan information provided by the card 173 are skipped by the operation of the scanning system described above. The reason why the card 173 provides the signal processing system with the scan information is that even if the configuration of the pachinko ball machine is changed, the signal processing system can deal with the change without modification of the system.

The channel switch logic 54 and the analog multiplexer 52 switch a signal from each reception line 26 in sequence every scanning period indicated by the reception line switch pulse signal RXCLK (see step 95). Upon completion of 32 repetitions of the operation for the 32 reception lines 26 (see step 96), the channel switch logic 43 and the analog multiplexer 44 switch the current transmission line 22 based on the transmission line switch pulse signal TXCLK (see step 97). Again, similar processing is repeated 32 times. The number of pulses of the transmission line switch pulse signal TXCLK output when the transmission line is switched is the skip count set in the transmission line switch pulse generator 204 by the information processor 30 on the rising edge of the interrupt pulse preceding the current interrupt pulse, as shown in FIG. 12. Therefore, as many transmission lines 22 as the skip count are skipped.

For example, when the next and one after next transmission lines 22 to which a signal is to be input are not registered as detection positions in the scan information registered on the card 173, three pulses of the transmission line switch pulse signal TXCLK are output as shown in FIG. 12. Thus, the two transmission lines 22 are skipped.

The transmission line switch pulse signal TXCLK is shown in magnified wavelength in FIG. 12; in fact, it has an extremely short pulse width. The skip operation is performed for a considerably shorter time than the scanning period. Thus, the skip time does not hinder the detection operation on the first reception line 26 immediately after the transmission line is switched.

The information processor 30 can read the sense data stored in the bidirectional RAM 76 for judging that a pachinko ball exists, at what time and at what position (sensing unit 20*a*), under any desired retrieval conditions, whenever necessary, independently of the above-mentioned detection signal processing.

Thus, the information processor 30 can read the sense data recorded in the bidirectional RAM 76 by a read start signal, as required, perform operations on the read sense data, and compare the sense data with the pachinko ball monitor data stored on the card 173 for monitoring pachinko balls.

The metallic body detecting apparatus of the embodiment can omit the detection operation on specific transmission lines 22 as specified in the scan information stored on the card 173 that can be set as desired by the user and perform the detection operation only on the specified transmission lines 22 one after another. Pachinko balls can be managed based on the detection operation results.

Therefore, the scan information can be set according to the pachinko ball machine type, etc., for scanning a minimum necessary range corresponding to the pachinko ball machine type, etc., without wasting time needed for improving the detection speed.

In the embodiment, the sequence controlling circuit 47 outputs a first timing signal to the reception circuit 50 for scanning the lines in sequence and a second timing signal to the transmission circuit 40 for switching the current scanning to the next line each time all reception lines have been scanned. Therefore, lines not to be scanned are specified for the transmission lines scanned in response to the second timing signal. However, the invention is not limited to the configuration. For example, all transmission lines may be scanned and some reception lines may be skipped, in which case the configuration for the transmission lines and that for the reception lines may be replaced with each other in the circuit shown in FIG. 11.

The embodiment makes it possible to decrease the electromagnetic effect leaking to the outside in the transmission section of the matrix sensor; even if the detecting apparatus of the invention are installed close to each other, mutual interference does not occur.

Further, according to the embodiment, any desired scan area can be set by controlling the transmission or reception lines to be operated, so that pachinko ball behavior can be monitored more efficiently.

We claim:

1. A metallic body detecting apparatus for a pachinko ball machine having a base board on which a gaming area is set, said base board also having a guide rail, said detecting apparatus comprising:

a sensor to be placed facing said base board, said sensor having a plurality of sensing units each for sensing the presence of a metallic body, the sensing units respectively positioned in a plurality of detection points that are defined along a trajectory path through which metallic bodies are propelled into the gaming area; and a signal processing system for driving said sensor for sensing metallic bodies, said signal processing system having storage means for storing information that selects one or more sensing units from among the sensing units positioned in said plurality of detection points, said signal processing system receives a signal from each sensing unit positioned in the detection points and selected according to the information stored in said storage means, and determines whether or not a respective signal level of each signal changes as compared with a reference value, said signal processing system deternines that a metallic body propelled into the gaming area has been detected when the signal level from a selected sensing unit belonging to any detection point changes.

2. The metallic body detecting apparatus as claimed in claim 1 wherein said trajectory path is adapted for use as an entrance area to the gaming area of said pachinko ball machine and adapted for location along said guide rail of said pachinko ball machine.

3. The metallic body detecting apparatus as claimed in claim 2 wherein when the change in signal level is larger than a signal ripple with respect to the reference value, said signal processing system determines the signal level changing compared with the reference value.

4. The metallic body detecting apparatus as claimed in claim 3 wherein said signal processing system further includes a counter for counting the number of times a metallic body has been detected.

5. The metallic body detecting apparatus as claimed in claim 1 wherein said sensor is a matrix sensor comprising sensing units placed like a matrix.

6. The metallic body detecting apparatus as claimed in claim 1 wherein said sensor has a plurality of transmission lines excited by a signal current, a plurality of reception lines being placed crossing said transmission lines for receiving induced current by exciting the transmission lines, and a board for supporting them, intersections of said transmission and reception lines being placed like a matrix as the sensing units.

7. The metallic body detecting apparatus as claimed in claim 6 wherein said signal processing system comprises a transmission circuit for scanning the transmission lines in sequence and sending a signal current to them, a reception circuit for scanning the reception lines in sequence and reading their induced currents in sequence, and a signal processor for outputting control signals to said transmission and reception circuits for causing said circuits to scan the transmission lines and the reception lines respectively, determining whether or not a metallic body exists from the signal received at said reception circuit, and detecting a position at which the metallic body is sensed, based on information indicating a transmission line scanning position of the transmission circuit and information indicating a reception line scanning position of the reception circuit.

8. The metallic body detecting apparatus as claimed in claim 7 wherein said signal processing system receives the information selecting the sensing units positioned in the detection points, and based on this information, outputs a control signal to said transmission circuit so as to scan only the transmission lines that intersect the detection points.

9. The metallic body detecting apparatus as claimed in claim 7 wherein said signal processing system receives the information selecting the sensing units positioned in the detection points, and based on this information, outputs a control signal to said reception circuit so as to scan only the reception lines that intersect the detection points.

10. The metallic body detecting apparatus as claimed in claim 1 wherein said signal processing system detects a metallic body propelled into the gaming area periodically for a duration longer than the time required for the metallic body to pass through said trajectory path along which the detection points are placed and shorter than the period in which the metallic body is propelled into the gaming area.

11. A metallic body detecting apparatus comprising a matrix sensor having a detection area spreading like a plane and a signal processing system for driving the matrix sensor for detecting presence of a metallic body and a position thereof, said matrix sensor having a transmission line group consisting of parallel lines, a reception line group consisting of parallel lines, and a board for supporting them, the transmission line group and the reception line group crossing each other with intersections of the transmission and reception lines being arranged like a matrix on the board, wherein the improvement comprises:

said signal processing system comprising:

a transmission circuit for scanning the transmission lines in sequence and sending a signal current to them;

a reception circuit for scanning the reception lines in sequence and reading their reception signals in sequence; and a signal processor for outputting control signals to said transmission and reception circuits for causing said circuits to scan the transmission line group and the reception line group respectively, determining whether or not a metallic body exists from the signal received at said reception circuit, and detecting a position at which the metallic body is sensed, based on information indicating a transmission line scanning position of the transmission circuit and information indicating a reception line scanning position of the reception circuit, said transmission circuit for limiting signal currents sent to predetermined specific transmission lines in the transmission line group so that they are lower than signal currents to other transmission lines.

12. The metallic body detecting apparatus as claimed in claim 11 wherein the specific transmission lines to which signal currents limited so that they are lower than signal currents to other transmission lines by said transmission circuit are sent are one or more transmission lines placed on at least one end in the parallel transmission line group.

13. The metallic body detecting apparatus as claimed in claim 12 wherein the specific transmission lines to which signal currents, limited so that they are lower than signal currents to other transmission lines by said transmission circuit, are sent, are a plurality of transmission lines placed on at least one end in the parallel transmission line group, and wherein said transmission circuit further limits a signal current sent to the transmission line placed on the far end in said plurality of transmission lines to which limited transmission currents are sent so that it is lower than signal currents to the remaining transmission lines.

14. The metallic body detecting apparatus as claimed in claim 13 wherein said transmission circuit has a resistor group consisting of one or more resistors connected to the transmission lines for limiting signal currents.

15. The metallic body detecting apparatus as claimed in claim 14 wherein said transmission line group consists of parallel lines placed from top to bottom; and said transmission circuit has a first resistor connected to the transmission line placed on the top;

a second resistor connected to the transmission line placed on the bottom and having a resistance value lower than the first resistor;

a third resistor connected to the transmission line placed on the second line from the top and having a resistance value lower than the second resistor; and a plurality of fourth resistors connected to all other transmission lines and having a resistance value lower than the third resistor.

16. The metallic body detecting apparatus as claimed in claim 11 wherein said matrix sensor is placed on a plane facing a base board on which a gaming area of a pachinko ball machine is set, said signal processing system further including storage means for storing information specifying transmission lines, at least parts of which are positioned in a predetermined area through which pachinko balls propelled into the gaming area can pass, said signal processor for receiving the information in said storage means, and based on the information, selectively scanning only the specified transmission lines.

17. The metallic body detecting apparatus as claimed in claim 11 wherein said matrix sensor is placed on a plane facing a base board on which a gaming area of a pachinko ball machine is set, said signal processing system further including storage means for storing information specifying said reception lines, at least parts of which are positioned in a predetermined area through which pachinko balls propelled into the gaming area can pass, said signal processor for receiving the information in said storage means, and based on the information, selectively scanning only the specified reception lines.

18. The metallic body detecting apparatus as claimed in claim 11 wherein said matrix sensor is placed on a plane facing a base board on which a gaming area of a pachinko ball machine is set, said signal processing system further including storage means for storing information specifying transmission and reception lines, at least parts of which are positioned in a predetermined area through which pachinko balls propelled into the gaming area can pass, said signal processor for receiving the information in said storage means, and based on the information, selectively scanning only the specified transmission and reception lines.

* * * * *